United States Patent
Lee et al.

(10) Patent No.: US 9,413,991 B2
(45) Date of Patent: Aug. 9, 2016

(54) LINEAR-LOGARITHMIC IMAGE SENSORS AND ELECTRONIC DEVICES INCLUDING THE SAME

(71) Applicant: Samsung Electronics Co., Ltd., Suwon-si, Gyeonggi-do (KR)

(72) Inventors: Ji-Won Lee, Daegu (KR); Dong-Joo Yang, Seongnam-si (KR); Min-Seok Oh, Osan-si (KR); Moo-Sup Lim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/592,495

(22) Filed: Jan. 8, 2015

(65) Prior Publication Data

US 2015/0288900 A1  Oct. 8, 2015

(30) Foreign Application Priority Data

Apr. 8, 2014  (KR) .......................... 10-2014-0041968

(51) Int. Cl.
| | | |
|---|---|---|
| *H04N 3/14* | (2006.01) | |
| *H04N 5/335* | (2011.01) | |
| *H04N 5/355* | (2011.01) | |

(52) U.S. Cl.
CPC ....... *H04N 5/35518* (2013.01); *H04N 5/35527* (2013.01)

(58) Field of Classification Search
CPC .............. H04N 5/35518; H04N 5/35527
USPC ........... 348/294–324; 250/208.1; 257/29–292
See application file for complete search history.

(56) References Cited

U.S. PATENT DOCUMENTS

| | | | |
|---|---|---|---|
| 7,420,599 B2 | 9/2008 | Hofflinger et al. | |
| 7,804,537 B2 | 9/2010 | Storm et al. | |
| 8,223,240 B2* | 7/2012 | Kusuda | H04N 3/1568 348/302 |
| 8,497,460 B2 | 7/2013 | Nakayama | |
| 8,593,550 B2 | 11/2013 | Lee et al. | |
| 2011/0122282 A1 | 5/2011 | Katagiri et al. | |
| 2012/0211642 A1 | 8/2012 | Iwamoto et al. | |

FOREIGN PATENT DOCUMENTS

| | | |
|---|---|---|
| JP | 2013-058960 | 3/2013 |
| JP | 2013-118595 | 6/2013 |
| JP | 2013-183347 | 9/2013 |

* cited by examiner

*Primary Examiner* — Yogesh Aggarwal
(74) *Attorney, Agent, or Firm* — Myers Bigel & Sibley, P.A.

(57) ABSTRACT

A linear-logarithmic image sensor includes a pixel array, a signal generation unit, and a control unit. The pixel array includes at least one unit pixel that generates a leakage signal corresponding to leakage photo-charges and that sequentially generates a first analog signal corresponding to a portion of accumulated photo-charges and a second analog signal corresponding to a whole of the accumulated photo-charges by resetting a floating diffusion node and transferring the accumulated photo-charges from a storage node to the floating diffusion node in response to first and second transfer control signals that are sequentially activated. The signal generation unit includes at least one signal generation block that generates a final analog signal based on the leakage signal, the first analog signal, and the second analog signal. The control unit controls the pixel array and the signal generation unit.

14 Claims, 18 Drawing Sheets

LINEAR-LOGARITHMIC IMAGE SENSORS AND ELECTRONIC DEVICES INCLUDING THE SAME

CROSS-REFERENCE TO RELATED APPLICATION(S)

This application claims priority under 35 USC §119 to Korean Patent Application No. 10-2014-0041968, filed on Apr. 8, 2014 in the Korean Intellectual Property Office (KIPO), the contents of which are incorporated herein in its entirety by reference.

BACKGROUND

1. Technical Field

Example embodiments relate generally to image sensors. More particularly, embodiments of the present inventive concepts relate to a linear-logarithmic image sensors that reduce a fixed pattern noise (FPN), and electronic devices including the linear-logarithmic image sensors.

2. Description of the Related Art

An image sensor is a semiconductor device that converts a photographic image into an electric signal. Image sensors are widely used in electronic devices such as digital cameras, cellular phones, etc. Generally, an image sensor includes a linear image sensor that outputs an electric signal that is linearly proportional to incident light, a logarithmic image sensor that outputs an electric signal that is logarithmically proportional to incident light, and/or a linear-logarithmic image sensor that outputs an electric signal that is linearly proportional to weak incident light and that outputs an electric signal that is logarithmically proportional to strong incident light, etc. However, since characteristic differences exist among a plurality of unit pixels included in the image sensor, deviation may occur among respective analog signals that are output by the unit pixels in response to identical incident light. This deviation may result in a fixed pattern noise (FPN). Reducing the fixed pattern noise is important for improving the performance of an image sensor (e.g., to improve an image-quality of the image sensor).

SUMMARY

Some example embodiments provide a linear-logarithmic image sensor capable of effectively reducing a fixed pattern noise.

Some example embodiments provide an electronic device including the linear-logarithmic image sensor.

According to an aspect of example embodiments, a linear-logarithmic image sensor may include a pixel array including at least one unit pixel that generates a leakage signal corresponding to leakage photo-charges that leak from a storage node to a floating diffusion node while photo-charges that are generated in response to incident light by a photoelectric conversion device are accumulated in the storage node and that sequentially generates a first analog signal corresponding to a portion of accumulated photo-charges and a second analog signal corresponding to a whole of the accumulated photo-charges by resetting the floating diffusion node and transferring the accumulated photo-charges of the storage node to the floating diffusion node in response to first and second transfer control signals that are sequentially activated, a signal generation unit including at least one signal generation block that generates a final analog signal based on the leakage signal, the first analog signal, and the second analog signal, and a control unit configured to control the pixel array and the signal generation unit.

In example embodiments, the linear-logarithmic image sensor may further include an analog-digital conversion unit including at least one analog-digital conversion block that converts the final analog signal into a digital signal.

In example embodiments, the first transfer control signal may be activated to have a first voltage level, and the second transfer control signal may be activated to have a second voltage level that is higher than the first voltage level.

In example embodiments, the signal generation block may select one of a first final analog signal, a second final analog signal, and a third final analog signal as the final analog signal, the first final analog signal being the second analog signal, the second final analog signal being a sum of the second analog signal and the leakage signal, the third final analog signal being a sum of the first analog signal and a predetermined offset signal.

In example embodiments, the signal generation block may select the first final analog signal as the final analog signal when the second final analog signal is smaller than a predetermined first reference value. In addition, the signal generation block may select the second final analog signal as the final analog signal when the second final analog signal is greater than the predetermined first reference value and smaller than a predetermined second reference value. Further, the signal generation block may select the third final analog signal as the final analog signal when the second final analog signal is greater than the predetermined second reference value.

In example embodiments, the signal generation block may select the first final analog signal as the final analog signal when an intensity of the incident light is smaller than a predetermined first illuminance. In addition, the signal generation block may select the second final analog signal as the final analog signal when the intensity of the incident light is greater than the predetermined first illuminance and smaller than a predetermined second illuminance. Further, the signal generation block may select the third final analog signal as the final analog signal when the intensity of the incident light is greater than the predetermined second illuminance.

In example embodiments, the unit pixel may include the photoelectric conversion element, a transfer transistor having a source electrode corresponding to the storage node, a drain electrode corresponding to the floating diffusion node, and a gate electrode to which the first transfer control signal and the second transfer control signal are applied, a reset transistor having a source electrode coupled to the floating diffusion node, a drain electrode coupled to a power voltage, and a gate electrode to which a reset control signal is applied, a sensing transistor having a drain electrode coupled to the power voltage and a gate electrode coupled to the floating diffusion node, and a row selection transistor having a drain electrode coupled to a source electrode of the sensing transistor, a gate electrode to which a row selection signal is applied, and a source electrode at which the leakage signal, the first analog signal, and the second analog signal are output.

In example embodiments, the reset transistor may be turned off while the leakage photo-charges leak to the floating diffusion node. In addition, the reset transistor may be turned on while the floating diffusion node is reset. Further, the reset transistor may be turned off while the accumulated photo-charges are transferred to the floating diffusion node.

In example embodiments, the transfer transistor may transfer the portion of the accumulated photo-charges to the floating diffusion node when the transfer transistor is weakly turned on in response to the first transfer control signal that is activated to have the first voltage level. In addition, the transfer transistor may transfer the rest of the accumulated photo-charges to the floating diffusion node when the transfer transistor is strongly turned on in response to the second transfer control signal that is activated to have the second voltage level.

In example embodiments, the leakage signal corresponding to the leakage photo-charges stored in the floating diffusion node, the first analog signal corresponding to the portion of the accumulated photo-charges stored in the floating diffusion node, and the second analog signal corresponding to the whole of the accumulated photo-charges stored in the floating diffusion node may be sequentially output when the row selection transistor is turned on.

According to another aspect of example embodiments, an electronic device may include a linear-logarithmic image sensor, a storage device, and a processor that controls the linear-logarithmic image sensor and the storage device. Here, the linear-logarithmic image sensor may include a pixel array including at least one unit pixel that generates a leakage signal corresponding to leakage photo-charges that leak from a storage node to a floating diffusion node while photo-charges that are generated in response to incident light by a photoelectric conversion device are accumulated in the storage node and that sequentially generates a first analog signal corresponding to a portion of accumulated photo-charges and a second analog signal corresponding to a whole of the accumulated photo-charges by resetting the floating diffusion node and transferring the accumulated photo-charges of the storage node to the floating diffusion node in response to first and second transfer control signals that are sequentially activated, a signal generation unit including at least one signal generation block that generates a final analog signal based on the leakage signal, the first analog signal, and the second analog signal, an analog-digital conversion unit including at least one analog-digital conversion block that converts the final analog signal into a digital signal, and a control unit configured to control the pixel array, the signal generation unit, and the analog-digital conversion unit.

In example embodiments, the first transfer control signal may be activated to have a first voltage level, and the second transfer control signal may be activated to have a second voltage level that is higher than the first voltage level.

In example embodiments, the signal generation block may select one of a first final analog signal, a second final analog signal, and a third final analog signal as the final analog signal, the first final analog signal being the second analog signal, the second final analog signal being a sum of the second analog signal and the leakage signal, the third final analog signal being a sum of the first analog signal and a predetermined offset signal.

In example embodiments, the signal generation block may select the first final analog signal as the final analog signal when the second final analog signal is smaller than a predetermined first reference value. In addition, the signal generation block may select the second final analog signal as the final analog signal when the second final analog signal is greater than the predetermined first reference value and smaller than a predetermined second reference value. Further, the signal generation block may select the third final analog signal as the final analog signal when the second final analog signal is greater than the predetermined second reference value.

In example embodiments, the signal generation block may select the first final analog signal as the final analog signal when an intensity of the incident light is smaller than a predetermined first illuminance. In addition, the signal generation block may select the second final analog signal as the final analog signal when the intensity of the incident light is greater than the predetermined first illuminance and smaller than a predetermined second illuminance. Further, the signal generation block may select the third final analog signal as the final analog signal when the intensity of the incident light is greater than the predetermined second illuminance.

Therefore, a linear-logarithmic image sensor according to example embodiments may effectively reduce a fixed pattern noise caused by threshold voltage distribution of transfer transistors of unit pixels by dividing a signal generation region of the linear-logarithmic image sensor into a linear region (e.g., a region for low illuminance), an extended linear region (e.g., a region for medium illuminance), and a logarithmic region (e.g., a region for high illuminance) and by using different final analog signals for the linear region, the extended linear region, and the logarithmic region (e.g., a first final analog signal is used in the linear region, a second final analog signal is used in the extended linear region, and a third final analog signal is used in the logarithmic region).

In addition, an electronic device including the linear-logarithmic image sensor according to example embodiments may provide a high-quality image to a user.

BRIEF DESCRIPTION OF THE DRAWINGS

Illustrative, non-limiting example embodiments will be more clearly understood from the following detailed description in conjunction with the accompanying drawings.

DETAILED DESCRIPTION OF THE EMBODIMENTS

Figure 1:
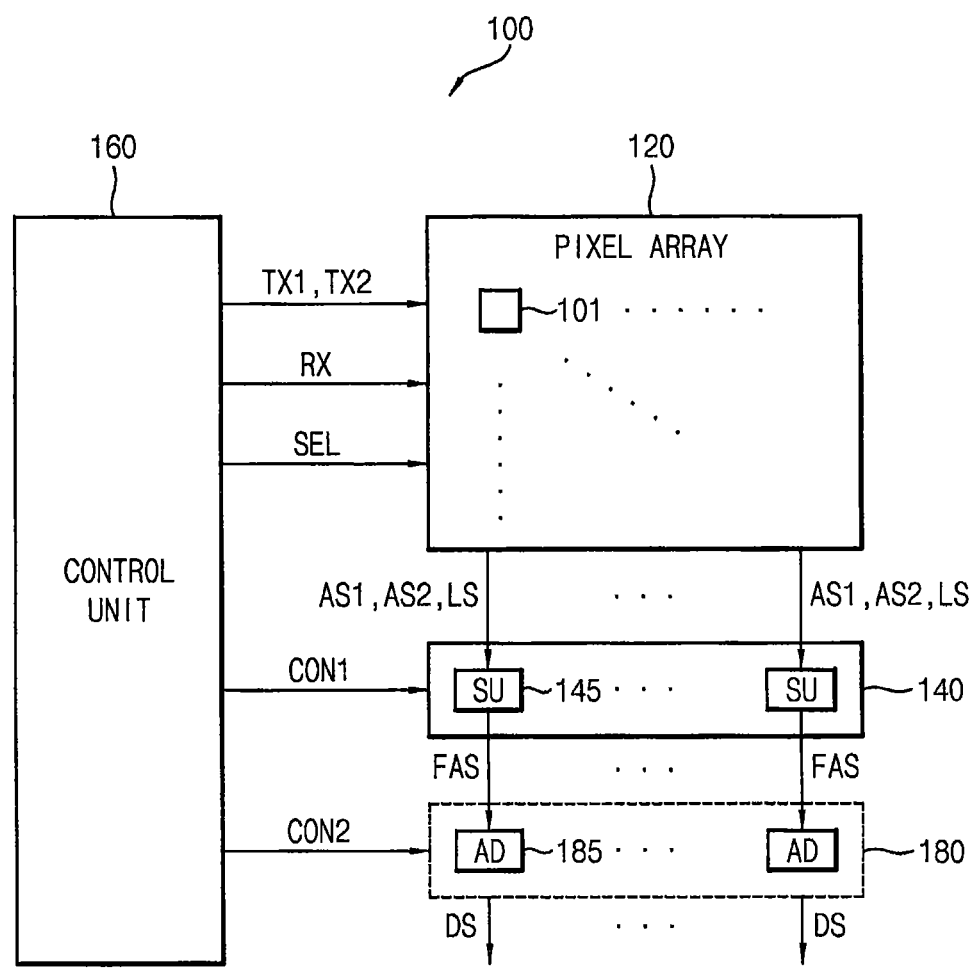
FIG. 1 is a block diagram illustrating a linear-logarithmic image sensor according to some embodiments.

Various example embodiments will be described more fully with reference to the accompanying drawings, in which some example embodiments are shown. The present inventive concepts may, however, be embodied in many different forms and should not be construed as limited to the embodiments set forth herein. Rather, these embodiments are provided so that this disclosure will be thorough and complete, and will fully convey the scope of the present inventive concepts to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which these inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 2:
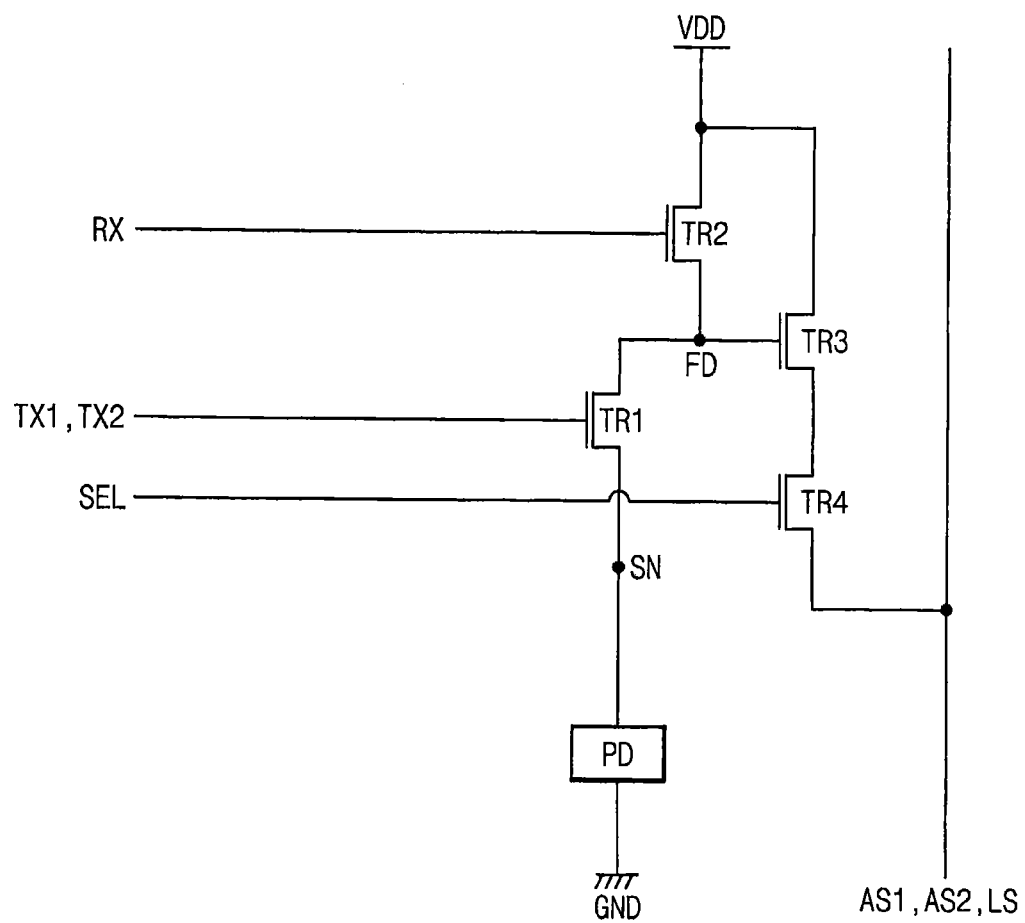
FIG. 2 is a circuit diagram illustrating an example of a unit pixel included in a pixel array of the linear-logarithmic image sensor of FIG. 1.
Figure 3:
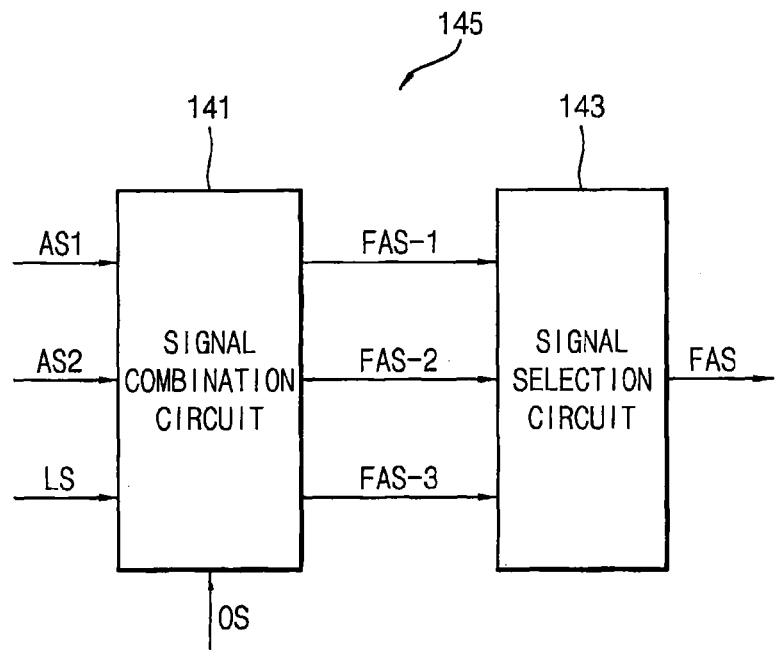
FIG. 3 is a block diagram illustrating an example of a signal generation block included in a signal generation unit of the linear-logarithmic image sensor of FIG. 1.

FIG. 1 is a block diagram illustrating a linear-logarithmic image sensor according to some embodiments. FIG. 2 is a circuit diagram illustrating an example of a unit pixel included in a pixel array of the linear-logarithmic image sensor of FIG. 1. FIG. 3 is a block diagram illustrating an example of a signal generation block included in a signal generation unit of the linear-logarithmic image sensor of FIG. 1.

Referring to FIGS. 1 through 3, the linear-logarithmic image sensor 100 may include a pixel array 120, a signal generation unit 140, and a control unit 160. In some embodiments, the linear-logarithmic image sensor 100 may further include an analog-digital conversion unit 180, although in some embodiments the analog-digital conversion unit may be provided separately from the linear-logarithmic image sensor 100.

The pixel array 120 may include a plurality of unit pixels 101 that may be arranged in columns and rows, although other arrangements may be used. Each of the unit pixels 101 may detect incident light and may generate a leakage signal LS, a first analog signal AS1, and a second analog signal AS2 in response to the incident light. Referring to FIGS. 1 and 2, each of the unit pixels 101 may generate a leakage signal LS corresponding to leakage photo-charges that leak from a storage node SN to a floating diffusion node FD as photo-charges that are generated by the photoelectric conversion device PD in response to incident light are accumulated in the storage node SN. Subsequently, each of the unit pixels 101 may reset the floating diffusion node FD, and then may transfer accumulated photo-charges of the storage node SN to the floating diffusion node FD in response to first and second transfer control signals TX1 and TX2 that are activated sequentially.

Thus, the first analog signal AS1 and the second analog signal AS2 are generated sequentially in response to the first and second transfer control signals, respectively. The first analog signal AS1 corresponds to a first portion of the photo-charges accumulated in the storage node SN, and the second analog signal AS2 corresponds to a second portion of the photo-charges accumulated in the storage node SN. In some embodiments, the second portion of the photo-charges accumulated in the storage node SN may correspond to an entirety of the photo-charges accumulated in the storage node SN. The first transfer control signal TX1 may be activated to have a first voltage level, and the second transfer control signal TX2 may be activated to have a second voltage level that is higher than the first voltage level. Accordingly, a first portion of the accumulated photo-charges transferred to the floating diffusion node FD in response to the first transfer control signal TX1 that is activated to have the first voltage level may be output as the first analog signal AS1, and a second portion of the accumulated photo-charges transferred to the floating diffusion node FD in response to the second transfer control signal TX2 that is activated to have the second voltage level may be output as the second analog signal AS2.

In the embodiments illustrated in FIG. 2, each of the unit pixels 101 may include the photoelectric conversion device PD, a transfer transistor TR1, a reset transistor TR2, a sensing transistor TR3, and a row selection transistor TR4. In some embodiments, the photoelectric conversion device PD may include a photodiode, although the photoelectric conversion device PD is not limited to photodiodes. The photoelectric conversion device PD may generate photo-charges in response to incident light. The photoelectric conversion device PD may be coupled between the storage node SN and a ground voltage GND. The transfer transistor TR1 may include a source electrode corresponding to the storage node SN, a drain electrode corresponding to the floating diffusion node FD, and a gate electrode to which the first transfer control signal TX1 and the second transfer control signal TX2 are applied. When the transfer transistor TR1 is turned off, the storage node SN may be electrically decoupled from the floating diffusion node FD. Thus, the photo-charges that are generated in response to the incident light by the photoelectric conversion device PD may be accumulated in the storage node SN. However, even when the storage node SN is electrically decoupled from the floating diffusion node FD when the transfer transistor TR1 is turned off, a portion of the photo-charges (i.e., the leakage photo-charges) may leak from the storage node SN to the floating diffusion node FD. Since conventional linear-logarithmic image sensors do not use the leakage photo-charges, the conventional linear-logarithmic image sensors may not fully utilize a transition region that exists between a linear region of operation and a logarithmic region of operation of the detector. On the other hand, the linear-logarithmic image sensor 100 may utilize the transition region that exists between the linear region of operation and the logarithmic region of operation by using the leakage photo-charges.

The transfer transistor TR1 may be turned off while the photo-charges that are generated in response to the incident light by the photoelectric conversion device PD are accumulated in the storage node SN. As described above, the leakage photo-charges that leak from the storage node SN to the floating diffusion node FD may be output as a leakage signal LS via the sensing transistor TR3 and the row selection transistor TR4. Then, the floating diffusion node FD may be reset. Resetting the floating diffusion node FD involves draining the charges that are accumulated in the floating diffusion node FD out through the reset transistor TR2.

Subsequently, when the transfer transistor TR1 is weakly turned on in response to the first transfer control signal TX1 that is activated to have the first voltage level, a portion of the accumulated photo-charges stored in the storage node SN may be transferred to the floating diffusion node FD. The portion of the accumulated photo-charges transferred to the floating diffusion node FD may be detected by the sensing transistor TR3, which outputs a corresponding signal as the first analog signal AS1 through the row selection transistor TR4. Next, when the transfer transistor TR1 is strongly turned on in response to the second transfer control signal TX2 that is activated to have the second voltage level, the remainder of the accumulated photo-charges stored in the storage node SN may be transferred to the floating diffusion node FD. Thus, since the remainder of the accumulated photo-charges are added to a first portion of the accumulated photo-charges previously transferred to the floating diffusion node FD, a second portion of the accumulated photo-charges transferred to the floating diffusion node FD may be output as the second analog signal AS2 via the sensing transistor TR3 and the row selection transistor TR4. Note that the floating diffusion region FD is not reset in between the outputting of the first analog signal AS1 and the second analog signal AS2.

Still referring to FIG. 2, the reset transistor TR2 may include a source electrode coupled to the floating diffusion node FD, a drain electrode coupled to a power voltage VDD, and a gate electrode to which a reset control signal RX is applied. While the storage node SN is electrically decoupled from the floating diffusion node FD when the transfer transistor TR1 is turned off, the reset transistor TR2 may be turned off when the leakage photo-charges leak from the storage node SN to the floating diffusion node FD. That is, since the power voltage VDD is electrically decoupled from the floating diffusion node FD when the reset transistor TR2 is turned off, the leakage photo-charges that leak from the storage node SN to the floating diffusion node FD may not be reset (i.e., eliminated) by the power voltage VDD. Thus, the leakage photo-charges may be output as the leakage signal LS via the sensing transistor TR3 and the row selection transistor TR4. After the leakage signal LS corresponding to the leakage photo-charges is output, the reset transistor TR2 may be turned on, causing the floating diffusion node FD to be reset. In addition, since the accumulated photo-charges of the storage node SN are transferred to the floating diffusion node FD after the floating diffusion node FD is reset, the reset transistor TR2 may be turned off in order that the power voltage VDD is electrically decoupled from the floating diffusion node FD. Thus, a first portion of the accumulated photo-charges that are transferred to the floating diffusion node FD may be output as the first analog signal AS1 via the sensing transistor TR3 and the row selection transistor TR4, and then a second portion of the accumulated photo-charges that are transferred to the floating diffusion node FD may be output as the second analog signal AS2 via the sensing transistor TR3 and the row selection transistor TR4.

The sensing transistor TR3 may include a source electrode coupled to a drain electrode of the row selection transistor TR4, a drain electrode coupled to the power voltage VDD, and a gate electrode coupled to the floating diffusion node FD. The row selection transistor TR4 may include the drain electrode coupled to the source electrode of the sensing transistor TR3, a gate electrode to which a row selection signal SEL is applied, and a source electrode at which the leakage signal LS, the first analog signal AS1, and the second analog signal AS2 are output. As described above, each of the unit pixels 101 may sequentially output leakage photo-charges stored in the floating diffusion node FD, a first portion of the accumulated photo-charges stored in the floating diffusion node FD, and a second portion of the accumulated photo-charges stored in the floating diffusion node FD as the leakage signal LS, the first analog signal AS1, and the second analog signal AS2, respectively via the sensing transistor TR3 and the row selection transistor TR4. That is, when the row selection transistor TR4 is turned on as the row selection signal SEL is activated, the leakage signal LS corresponding to the leakage photo-charges stored in the floating diffusion node FD, the first analog signal AS1 corresponding to a first portion of the accumulated photo-charges stored in the floating diffusion node FD, and the second analog signal AS2 corresponding to a second portion of the accumulated photo-charges stored in the floating diffusion node FD may be sequentially output.

Although it is described above that each of the unit pixels 101 includes one photoelectric conversion device PD and four transistors TR1, TR2, TR3, and TR4, a structure of each of the unit pixels 101 is not limited thereto. For example, each of the unit pixels 101 may have any structure that is capable of outputting the leakage signal LS, the first analog signal AS1, and the second analog signal AS2 in the above-mentioned manner.

Referring again to FIG. 1, the signal generation unit 140 may include a plurality of signal generation blocks 145 for generating a final analog signal FAS in response to on the leakage signal LS, the first analog signal AS1, and the second analog signal AS2. Each of the signal generation blocks 145 may be coupled to a respective column of the pixel array 100. Specifically, each of the signal generation blocks 145 may select one of a first final analog signal FAS-1, a second final analog signal FAS-2, and a third final analog signal FAS-3 as the final analog signal FAS. Here, the first final analog signal FAS-1 may be the second analog signal AS2 which corresponds to an entirety of the accumulated photo-charges, the second final analog signal FAS-2 may be a sum of the second analog signal AS2 which corresponds to an entirety of the accumulated photo-charges and the leakage signal LS corresponding to the leakage photo-charges, and the third final analog signal FAS-3 may be a sum of the first analog signal AS1 which corresponds to a portion of the accumulated photo-charges and a predetermined offset signal OS.

For this operation, as illustrated in FIG. 3, each of the signal generation blocks 145 may include a signal combination circuit 141 and a signal selection circuit 143. The signal combination circuit 141 may receive the leakage signal LS, the first analog signal AS1, and the second analog signal AS2, and may output the first final analog signal FAS-1, the second final analog signal FAS-2, and the third final analog signal FAS-3. For example, the signal combination circuit 141 may include at least one latch and at least one adder. The signal selection circuit 143 may receive the first final analog signal FAS-1, the second final analog signal FAS-2, and the third final analog signal FAS-3 from the signal combination circuit 141, and may select one of the first final analog signal FAS-1, the second final analog signal FAS-2, and the third final analog signal FAS-3 as the final analog signal FAS. For example, the signal selection circuit 143 may include at least one comparator and at least one multiplexer.

The signal generation blocks 145 may select the final analog signal FAS by comparing the second final analog signal FAS-2 (which corresponds to the sum of the second analog signal AS2 and the leakage signal) with a predetermined first reference value and a predetermined second reference value. For example, in some embodiments, the signal generation blocks 145 may select the first final analog signal FAS-1 as the final analog signal FAS when the second final analog signal FAS-2 is smaller than a predetermined first reference value. The signal generation blocks 145 may select the second final analog signal FAS-2 as the final analog signal FAS when the second final analog signal FAS-2 is between the predetermined first reference value and a predetermined second reference value (i.e., when the second final analog signal FAS-2 is greater than the predetermined first reference value and smaller than the predetermined second reference value). The signal generation blocks 145 may select the third final analog signal FAS-3 as the final analog signal FAS when the second final analog signal FAS-2 is greater than the predetermined second reference value. The predetermined first reference value and the predetermined second reference value may be determined in various ways according to requirements of the linear-logarithmic image sensor 100.

In some embodiments, the signal generation blocks 145 may select the final analog signal FAS by comparing an intensity of incident light with a predetermined first illuminance and a predetermined second illuminance. For example, the signal generation blocks 145 may select the first final analog signal FAS-1 as the final analog signal FAS when an intensity of the incident light is smaller than a predetermined first illuminance, may select the second final analog signal FAS-2 as the final analog signal FAS when an intensity of the incident light is between the predetermined first illuminance and a predetermined second illuminance (i.e., when an intensity of the incident light is greater than the predetermined first illuminance and smaller than the predetermined second illuminance), and may select the third final analog signal FAS-3 as the final analog signal FAS when an intensity of the incident light is greater than the predetermined second illuminance. The predetermined first illuminance and the predetermined second illuminance may be determined in various ways according to requirements of the linear-logarithmic image sensor 100.

The control unit 160 may control the pixel array 120 and the signal generation unit 140. Specifically, the control unit 160 may provide the row selection signal SEL, the reset control signal RX, the first transfer control signal TX1, and the second transfer control signal TX2 to the pixel array 120 to control the operation of the pixel array 120. Thus, each of the unit pixels 101 may generate the leakage signal LS corresponding to the leakage photo-charges while the photo-charges that are generated in response to the incident light by the photoelectric conversion device PD are accumulated in the storage node SN, and may sequentially generate the first analog signal AS1 corresponding to a first portion of the accumulated photo-charges and the second analog signal AS2 corresponding to a second portion of the accumulated photo-charges in response to the first and second transfer control signals TX1 and TX2 that are sequentially activated. As described above, the control unit 160 may activate the first transfer control signal TX1 to have the first voltage level, and may activate the second transfer control signal TX2 to have the second voltage level that is higher than the first voltage level. In addition, the control unit 160 may provide a first control signal CON1 to the signal generation unit 140 to control operations of the signal generation blocks 145 of the signal generation unit 140. Further, when the linear-logarithmic image sensor 100 includes the analog-digital conversion unit 180, the control unit 160 may provide a second control signal CON2 to the analog-digital conversion unit 180 to control operations of a plurality of analog-digital conversion blocks 185 of the analog-digital conversion unit 180.

The analog-digital conversion unit 180 may include a plurality of analog-digital conversion blocks 185 that convert the final analog signal FAS provided by the signal generation unit 140 into a digital signal DS. In some embodiments, at least one of the analog-digital conversion blocks 185 may generate the digital signal DS by performing a single-slope analog-digital conversion operation on the final analog signal FAS. In further embodiments, at least one of the analog-digital conversion blocks 185 may generate the digital signal DS by performing a sigma-delta analog-digital conversion operation on the final analog signal FAS. However, the analog-digital conversion operation performed by the analog-digital conversion blocks 185 is not limited to these examples. In brief, the linear-logarithmic image sensor 100 may effectively reduce a fixed pattern noise caused by threshold voltage distribution of transfer transistors TR1 of unit pixels 101 by dividing the signal generation region of the linear-logarithmic image sensor 100 into a linear region (e.g., a region of low illuminance), an extended linear region (e.g., a region of medium illuminance), and a logarithmic region (e.g., a region of high illuminance). By using different final analog signals for the linear region, the extended linear region, and the logarithmic region (e.g., the first final analog signal FAS-1 is used in the linear region, the second final analog signal FAS-2 is used in the extended linear region, and the third final analog signal FAS-3 is used in the logarithmic region), an electronic device including the linear-logarithmic image sensor 100 may provide a high-quality image to a user.

Figure 4A:
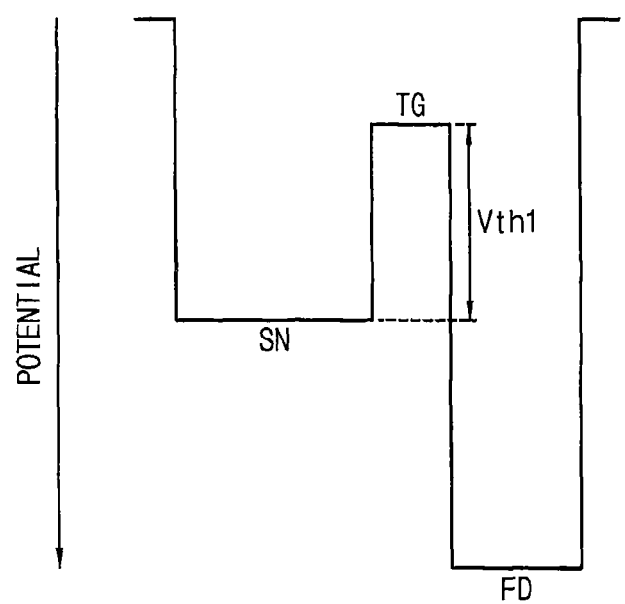
FIGS. 4A through 4C are diagrams illustrating an example in which photo-charges are accumulated in a storage node of a unit pixel that includes a transfer transistor having a relatively low threshold voltage in the linear-logarithmic image sensor of FIG. 1.
Figure 4B:
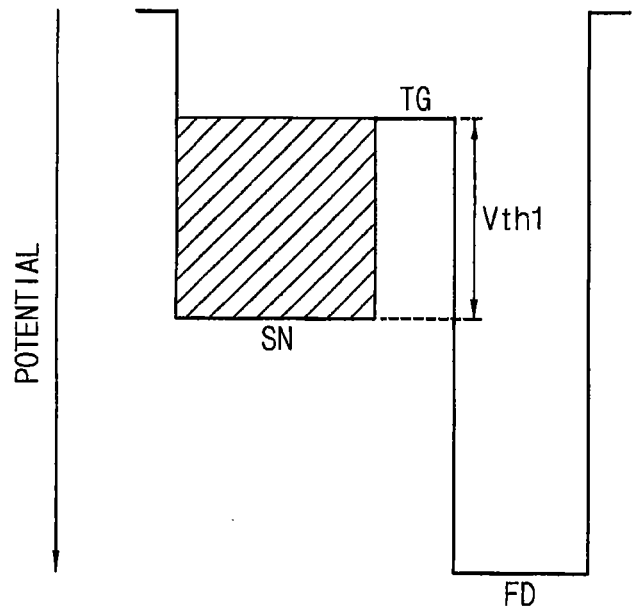
Figure 4C:
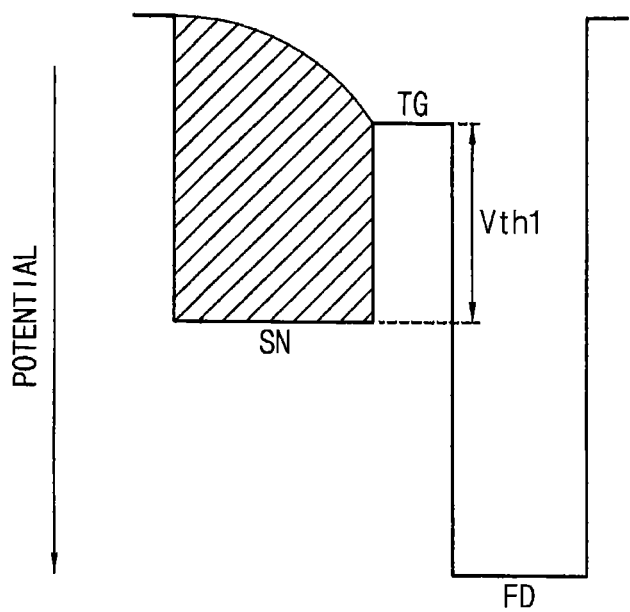
Figure 5A:
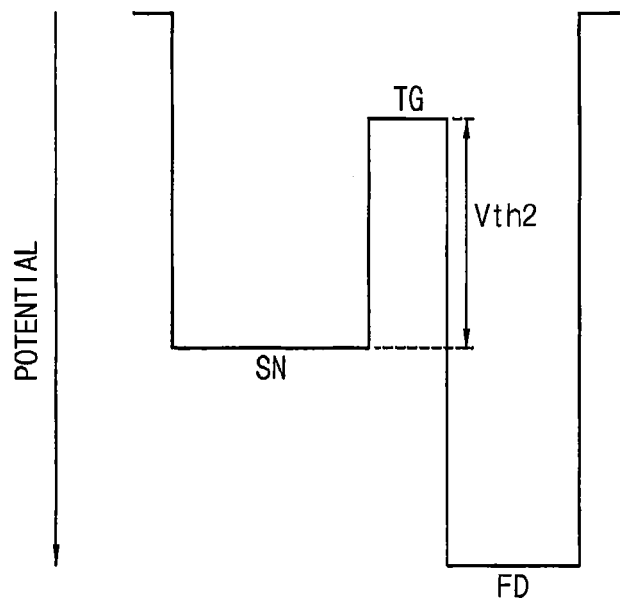
FIGS. 5A through 5C are diagrams illustrating an example in which photo-charges are accumulated in a storage node of a unit pixel that includes a transfer transistor having a relatively high threshold voltage in the linear-logarithmic image sensor of FIG. 1.
Figure 5B:
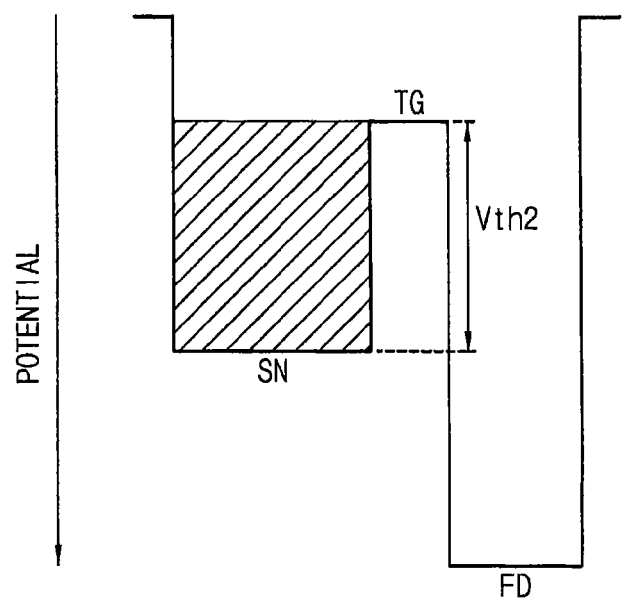
Figure 5C:
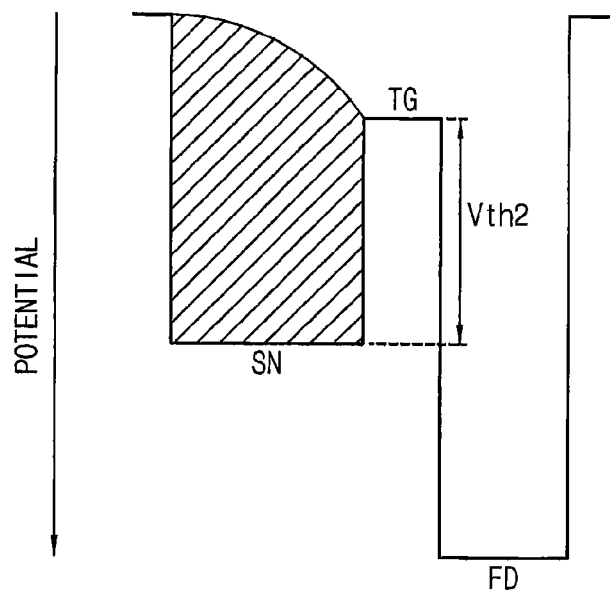

FIGS. 4A through 4C are diagrams illustrating an example in which photo-charges are accumulated in a storage node of a unit pixel that includes a transfer transistor having a relatively low threshold voltage in the linear-logarithmic image sensor of FIG. 1. FIGS. 5A through 5C are diagrams illustrating an example in which photo-charges are accumulated in a storage node of a unit pixel that includes a transfer transistor having a relatively high threshold voltage in the linear-logarithmic image sensor of FIG. 1.

Referring to FIGS. 4A through 5C, it is illustrated that a difference among threshold voltages of transfer transistors TR1 included in unit pixels 101 of the linear-logarithmic image sensor of FIG. 1 may result in deviation among the accumulated photo-charges of the storage node SN. Specifically, FIGS. 4A through 4C show that photo-charges are accumulated in the storage node SN of a first unit pixel that includes a transfer transistor TR1 having a relatively low threshold voltage (i.e., a first threshold voltage Vth1) in the linear-logarithmic image sensor 100. In addition, FIGS. 5A through 5C show that the photo-charges are accumulated in the storage node SN of a second unit pixel that includes the transfer transistor TR1 having a relatively high threshold voltage (i.e., a second threshold voltage Vth2) in the linear-logarithmic image sensor 100. Here, electric potentials of the storage node SN, the gate electrode TG of the transfer transistor TR1, and the floating diffusion node FD are illustrated in FIGS. 4A through 5C.

The transfer transistor TR1 included in the first unit pixel may have the first threshold voltage Vth1 that is lower than the second threshold voltage Vth2 of the transfer transistor TR1 included in the second unit pixel. As illustrated in FIG. 4A, photo-charges may not be stored (i.e., accumulated) in the storage node SN in an initial stage of operations. When light is incident on the photoelectric conversion device PD, however, photo-charges may be generated by the photoelectric conversion device PD in response. As illustrated in FIG. 4B, the amount of photo-charges stored in the storage node SN may increase linearly as the intensity of the incident light increases. As illustrated in FIG. 4C, after the photo-charges corresponding to the first threshold voltage Vth1 of the transfer transistor TR1 included in the first unit pixel are stored in the storage node SN, the amount of photo-charges stored in the storage node SN may increase logarithmically as the intensity of the incident light increases.

The transfer transistor TR1 included in the second unit pixel may have the second threshold voltage Vth2 that is higher than the first threshold voltage Vth1 of the transfer transistor TR1 included in the first unit pixel. As illustrated in FIG. 5A, photo-charges may not be stored (i.e., accumulated) in the storage node SN in an initial stage of operations. Again, photo-charges may be generated by the photoelectric conversion device PD in response to incident light. As illustrated in FIG. 5B, the photo-charges stored in the storage node SN may increase linearly as the intensity of the incident light increases. As illustrated in FIG. 5C, after the photo-charges corresponding to the second threshold voltage Vth2 of the transfer transistor TR1 included in the second unit pixel are stored in the storage node SN, the photo-charges stored in the storage node SN may increase logarithmically as the intensity of the incident light increases.

As described above, the photo-charges stored in the storage node SN may first increase in linear proportion to the intensity of the incident light, and then may increase in logarithmic proportion to the intensity of the incident light. However, the intensity of the incident light by which the photo-charges stored in the storage node SN begin to increase logarithmically may differ according to the threshold voltages Vth1 and Vth2 of the transfer transistors TR1 of unit pixels 101. Thus, when an intensity of the incident light is relatively weak, the photo-charges stored in the storage node SN of the first unit pixel that includes the transfer transistor TR1 having the first threshold voltage Vth1 is the same as the photo-charges stored in the storage node SN of the second unit pixel that includes the transfer transistor TR1 having the second threshold voltage Vth2, in response to the same incident light. On the other hand, when an intensity of the incident light is relatively strong, the amount of photo-charges stored in the storage node SN of the first unit pixel that includes the transfer transistor TR1 having the first threshold voltage Vth1 may be different from the amount of photo-charges stored in the storage node SN of the second unit pixel that includes the transfer transistor TR1 having the second threshold voltage Vth2, in response to the same incident light. That is, deviation of the photo-charges accumulated in the storage node SN in response to the same incident light may occur between the first unit pixel and the second unit pixel. Thus, if the analog signal is generated only based on the photo-charges stored (i.e., accumulated) in the storage node SN, fixed pattern noise may be caused by the deviation.

Figure 6:
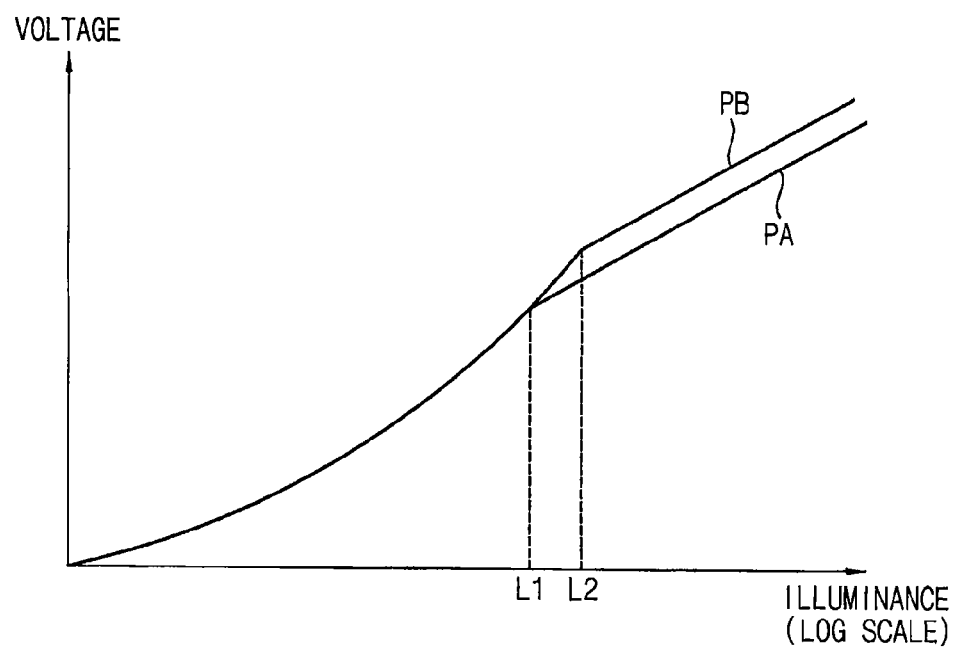
FIG. 6 is a graph for describing a fixed pattern noise due to a difference among threshold voltages of transfer transistors included in unit pixels of the linear-logarithmic image sensor of FIG. 1.

FIG. 6 is a graph that illustrates fixed pattern noise due to a difference between threshold voltages of transfer transistors included in unit pixels of the linear-logarithmic image sensor of FIG. 1.

Referring to FIG. 6, the first curve PA indicates an analog signal that is generated in response to the incident light when the analog signal is generated based on the photo-charges accumulated in the storage node SN of the first unit pixel that includes the transfer transistor TR1 having a relatively low threshold voltage. In addition, the second curve PB indicates an analog signal that is generated in response to the incident light when the analog signal is generated based on the photo-charges accumulated in the storage node SN of the second unit pixel that includes the transfer transistor TR1 having a relatively high threshold voltage.

As illustrated in FIG. 6, in the first unit pixel that includes the transfer transistor TR1 having a relatively low threshold voltage (i.e., indicated as the first graph PA), the analog signal may increase linearly as the intensity of the incident light increases below a first illuminance L1 and may increase logarithmically as the intensity of the incident light increases above the first illuminance L1. On the other hand, in the second unit pixel that includes the transfer transistor TR1 having a relatively high threshold voltage (i.e., indicated as the second graph PB), the analog signal may increase linearly as the intensity of the incident light increases below a second illuminance L2 and may increase logarithmically as the intensity of the incident light increases above the second illuminance L2. That is, a knee point of the analog signal that is generated in response to an intensity of the incident light may vary in response to deviation of threshold voltages of the transfer transistors TR1 of unit pixels 101. Thus, if the analog signal is generated only based on the photo-charges stored (i.e., accumulated) in the storage node SN, fixed pattern noise may be caused when an intensity of the incident light is higher than the first illuminance L1. For this reason, as described above, the linear-logarithmic image sensor 100 may effectively reduce the fixed pattern noise caused by threshold voltage distribution of the transfer transistors TR1 of unit pixels 101 by dividing a signal generation region of the linear-logarithmic image sensor 100 into a linear region (e.g., a region of low illuminance), an extended linear region (e.g., a region of medium illuminance), and a logarithmic region (e.g., a region of high illuminance) and by using different final analog signals for the linear region, the extended linear region, and the logarithmic region (e.g., a first final analog signal is used in the linear region, a second final analog signal is used in the extended linear region, and a third final analog signal is used in the logarithmic region). Hereinafter, an operation of the linear-logarithmic image sensor 100 will be described in detail with reference to FIGS. 7 through 9.

Figure 7:
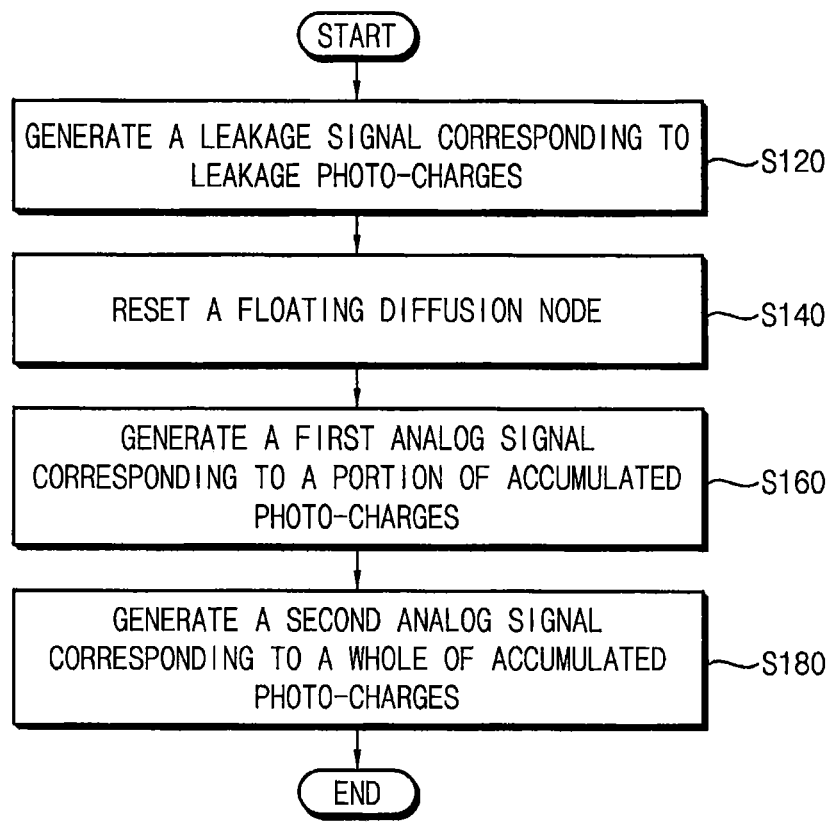
FIG. 7 is a flow chart illustrating an example in which a unit pixel operates in the linear-logarithmic image sensor of FIG. 1.
Figure 8:
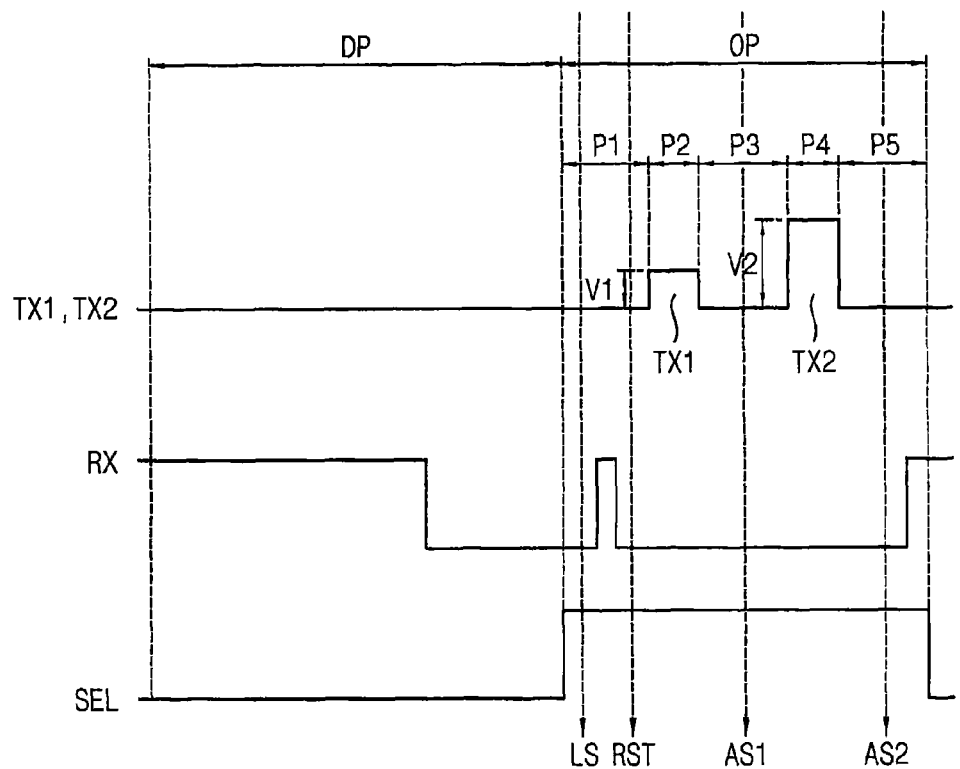
FIG. 8 is a timing diagram illustrating an example in which a unit pixel operates in the linear-logarithmic image sensor of FIG. 1.
Figure 9:
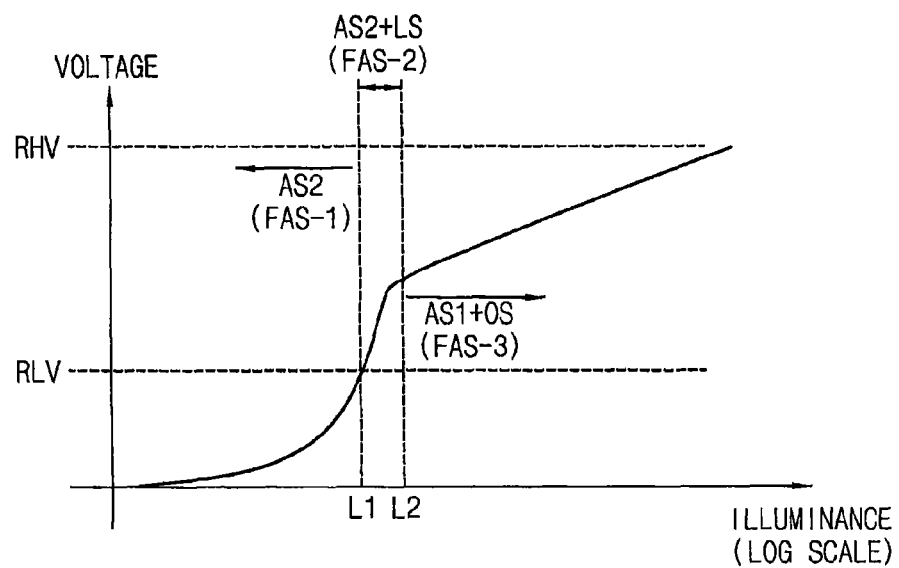
FIG. 9 is a graph illustrating a final analog signal that is generated by the linear-logarithmic image sensor of FIG. 1.

FIG. 7 is a flow chart illustrating an example in which a unit pixel operates in the linear-logarithmic image sensor of FIG. 1. FIG. 8 is a timing diagram illustrating an example in which a unit pixel operates in the linear-logarithmic image sensor of FIG. 1. FIG. 9 is a graph illustrating a final analog signal that is generated by the linear-logarithmic image sensor of FIG. 1.

Referring to FIGS. 7 through 9, the linear-logarithmic image sensor 100 may sequentially generate a leakage signal LS, a first analog signal AS1, and a second analog signal AS2, and may generate a final analog signal based on the leakage signal LS, the first analog signal AS2, and the second analog signal AS2. For this operation, each unit pixel 101 may generate a leakage signal LS corresponding to leakage photo-charges that leak from a storage node SN to a floating diffusion node FD (S120) while photo-charges that are generated in response to incident light by the photoelectric conversion device PD are accumulated in the storage node SN. Subsequently, each unit pixel 101 may reset the floating diffusion node FD (S140), and then may generate the first analog signal AS1 corresponding to a first portion of the accumulated photo-charges of the storage node SN in response to a first transfer control signal TX1 that is activated (S160). Next, each unit pixel 101 may generate the second analog signal AS2 corresponding to a second portion of the accumulated photo-charges of the storage node SN in response to a second transfer control signal TX2 that is activated (S180).

As illustrated in FIG. 8, an operation period of each unit pixel 101 may be divided into a detection period DP and an output period OP. In some embodiments, the detection period DP and the output period OP may be determined based on a logic level of a row selection signal SEL that is provided from a control unit 160. For example, a logic 'low' level (e.g., a low voltage level) of the row selection signal SEL may correspond to the detection period DP, and a logic 'high' level (e.g., a high voltage level) of the row selection signal SEL may correspond to the output period OP. Since the detection period DP and the output period OP are named for convenience of description, it should be understood that the operation period of each unit pixel 101 is separated based on the logic level of the row selection signal SEL. During the detection period DP, the control unit 160 may provide a gate electrode of a row selection transistor TR4 with the row selection signal SEL that is deactivated, may provide a gate electrode of a reset transistor TR2 with a reset control signal RX that is activated, and may provide a gate electrode of a transfer transistor TR1 with a transfer control signal TX1 and TX2 that is deactivated. Here, an activated state may correspond to a logic 'high' level, and a deactivated state may correspond to a logic 'low' level, although the inventive concepts are not limited thereto. During the detection period DP, the reset transistor TR2 may be turned on in response to the reset control signal RX that is activated. Thus, the reset transistor TR2 may reset the floating diffusion node FD by discharging the photo-charges stored in the floating diffusion node FD to the power voltage VDD during the detection period DP. During the detection period DP, the transfer transistor TR1 may be turned off in response to the transfer control signal TX1 and TX2 that is deactivated. Thus, the photo-charges that are generated by the photoelectric conversion element PD may be accumulated in the storage node SN during the detection period DP.

As described above, the linear-logarithmic image sensor 100 may divide a signal generation region of the linear-logarithmic image sensor 100 into a linear region (e.g., a region of low illuminance), an extended linear region (e.g., a region of medium illuminance), and a logarithmic region (e.g., a region of high illuminance). Since the linear-logarithmic image sensor 100 uses the leakage signal LS in the extended linear region, where the leakage signal LS corresponds to the leakage photo-charges that leak from the storage node SN to the floating diffusion node FD while the photo-charges that are generated in response to the incident light by the photoelectric conversion element PD are accumulated in the storage node SN, the control unit 160 may provide the gate electrode of the reset transistor TR2 with the reset control signal RX that is deactivated, during a portion of the detection period DP (e.g., a period between a certain point of the detection period DP and a start point of the output period OP). As a result, since the reset transistor TR2 is turned off in response to the reset control signal RX that is deactivated, the photo-charges of the floating diffusion node FD may not be discharged to the power voltage VDD. Thus, the leakage photo-charges that leak from the storage node SN to the floating diffusion node FD may be stored in the floating diffusion node FD, and the leakage photo-charges may be output as the leakage signal LS during the output period OP. Although it is illustrated in FIG. 8 that the reset control signal RX that is deactivated is provided to the gate electrode of the reset transistor TR2 during a portion of the detection period DP, the reset control signal RX that is deactivated may be provided to the gate electrode of the reset transistor TR2 during a whole of the detection period DP.

The output period OP may be divided into first through fifth periods P1, P2, P3, P4, and P5. During the output period OP, the control unit 160 may provide the gate electrode of the row selection transistor TR4 with the row selection signal SEL that is activated, and may provide the gate electrode of the reset transistor TR2 with the reset control signal RX that is deactivated. Thus, during the output period OP, the reset transistor TR2 may be turned off in response to the reset control signal RX that is deactivated. As a result, the floating diffusion node FD may be electrically separated (or, blocked) from the power voltage VDD. In addition, during the output period OP, the row selection transistor TR4 may be turned on in response to the row selection signal SEL that is activated. As a result, a sensing transistor TR3 may generate an output signal based on a potential of the floating diffusion node FD, and the row selection transistor TR4 may pass the output signal. Therefore, as illustrated in FIG. 8, the leakage signal LS, the first analog signal AS1, and the second analog signal AS2 may be sequentially output. As described above, the leakage photo-charges may be stored in the floating diffusion node FD when the reset transistor TR2 is turned off during a portion of the detection period DP. Hence, the floating diffusion node FD may be reset (i.e., indicated as RST) before the first analog signal AS1 and the second analog signal AS2 are output from each unit pixel 101 after the leakage signal LS is output from each unit pixel 101, where the floating diffusion node FD is reset when the reset transistor TR2 is turned on in response to the reset control signal RX that is activated (i.e., the leakage photo-charges of the floating diffusion node FD are discharged to the power voltage VDD). That is, the floating diffusion node FD of each unit pixel 101 may be reset (i.e., indicated as RST) during the first period P1. In some embodiments, each unit pixel 101 may output a specific analog signal indicating a reset level of the row selection transistor TR4 during the first period P1 to perform a correlated double sampling (CDS) operation.

Next, during the second period P2, the control unit 160 may provide the gate electrode of the transfer transistor TR1 with the first transfer control signal TX1 that is activated to have a first voltage level V1. During the second period P2, the transfer transistor TR1 may be weakly turned on in response to the first transfer control signal TX1 that is activated to have the first voltage level V1. Thus, the transfer transistor TR1 may transfer a portion of the accumulated photo-charges of the storage node SN to the floating diffusion node FD. As a result, during the third period P3, the row selection transistor TR4 may output the first analog signal AS1 that corresponds to a portion of the accumulated photo-charges that are transferred from the storage node SN to the floating diffusion node FD during the second period P2.

In addition, during the fourth period P4, the control unit 160 may provide the gate electrode of the transfer transistor TR1 with the second transfer control signal TX2 that is activated to have a second voltage level V2 that is higher than the first voltage level V1. In some embodiments, the second voltage level V2 may correspond to the power voltage VDD. During the fourth period P4, the transfer transistor TR1 may be strongly turned on in response to the second transfer control signal TX2 that is activated to have the second voltage level V2. Thus, the transfer transistor TR1 may transfer the rest of the accumulated photo-charges of the storage node SN (i.e., rest of the accumulated photo-charges that remain in the storage node SN) to the floating diffusion node FD. As a result, during the fifth period P5, the row selection transistor TR4 may output the second analog signal AS2 that corresponds to a sum of a portion of the accumulated photo-charges that are transferred from the storage node SN to the floating diffusion node FD during the second period P2 and the rest of the accumulated photo-charges that are transferred from the storage node SN to the floating diffusion node FD during the fourth period P4. Note that the reset signal RX remains low between the second period P2 and the fourth period P4 so that the floating diffusion node FD may not be reset between the activation of the first transfer control signal TX1 and the second transfer control signal TX2.

As described above, each unit pixel 101 may sequentially output the leakage signal LS, the first analog signal AS1, and the second analog signal AS2, where the leakage signal LS corresponds to the leakage photo-charges that leak from the storage node SN to the floating diffusion node FD while the photo-charges that are generated in response to the incident light by the photoelectric conversion device PD are accumulated in the storage node SN, the first analog signal AS1 corresponds to a first portion of the accumulated photo-charges of the storage node SN, and the second analog signal AS2 corresponds to a second portion of the accumulated photo-charges of the storage node SN.

Subsequently, the signal generation block 145 may generate a final analog signal FAS responsive to the leakage signal LS, the first analog signal AS1, and the second analog signal AS2. Specifically, as illustrated in FIG. 9, the signal generation block 145 may select one of a first final analog signal FAS-1, a second final analog signal FAS-2, and a third final analog signal FAS-3 as the final analog signal FAS, where the first final analog signal FAS-1 is the second analog signal AS2, the second final analog signal FAS-2 is a sum of the second analog signal AS2 and the leakage signal LS, and the third final analog signal FAS-3 is a sum of the first analog signal AS1 and a predetermined offset signal OS. In an example embodiment, the signal generation block 145 may select the first final analog signal FAS-1 as the final analog signal FAS when the second final analog signal FAS-2 is smaller than a predetermined first reference value RLV, may select the second final analog signal FAS-2 as the final analog signal FAS when the second final analog signal FAS-2 is greater than the predetermined first reference value RLV and smaller than a predetermined second reference value RHV, and may select the third final analog signal FAS-3 as the final analog signal FAS when the second final analog signal FAS-2 is greater than the predetermined second reference value RHV. In another example embodiment, the signal generation block 145 may select the first final analog signal FAS-1 as the final analog signal FAS when an intensity of the incident light is smaller than a predetermined first illuminance L1, may select the second final analog signal FAS-2 as the final analog signal FAS when an intensity of the incident light is greater than the predetermined first illuminance LA and smaller than a predetermined second illuminance L2, and may select the third final analog signal FAS-3 as the final analog signal FAS when an intensity of the incident light is greater than the predetermined second illuminance L2.

Figure 10:
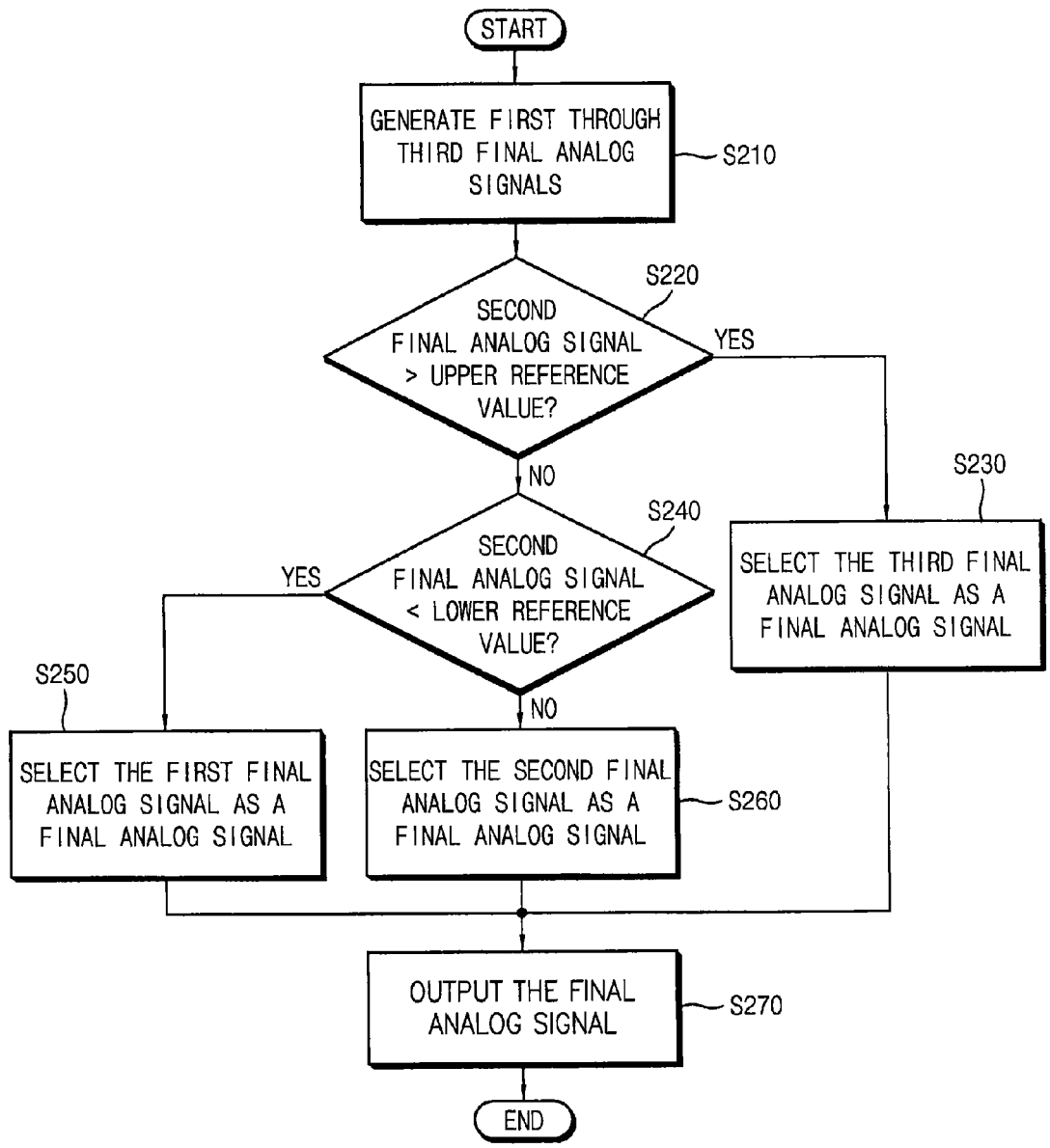
FIG. 10 is a flow chart illustrating an example in which a final analog signal is determined by the linear-logarithmic image sensor of FIG. 1.
Figure 11:
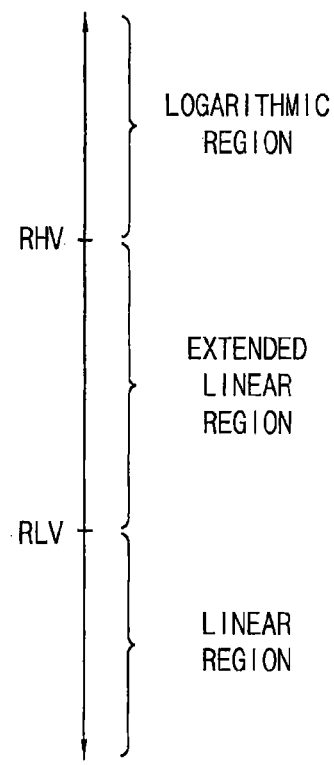
FIG. 11 is a diagram illustrating a signal generation region of the linear-logarithmic image sensor of FIG. 1.

FIG. 10 is a flow chart illustrating an example in which a final analog signal is determined by the linear-logarithmic image sensor of FIG. 1. FIG. 11 is a diagram illustrating a signal generation region of the linear-logarithmic image sensor of FIG. 1.

Referring to FIGS. 10 and 11, the linear-logarithmic image sensor 100 may determine the final analog signal FAS. Specifically, the linear-logarithmic image sensor 100 may generate first through third final analog signals FAS-1, FAS-2, and FAS-3 responsive to a leakage signal LS, a first analog signal AS1, and a second analog signal AS2 (S210). Subsequently, the linear-logarithmic image sensor 100 may check whether the second final analog signal FAS-2 is greater than a predetermined upper reference value (S220). When the second final analog signal FAS-2 is greater than the predetermined upper reference value, the linear-logarithmic image sensor 100 may select the third final analog signal FAS-3 as the final analog signal FAS (S230). On the other hand, when the second final analog signal FAS-2 is smaller than the predetermined upper reference value, the linear-logarithmic image sensor 100 may check whether the second final analog signal FAS-2 is smaller than a predetermined lower reference value (S240). When the second final analog signal FAS-2 is smaller than the predetermined lower reference value, the linear-logarithmic image sensor 100 may select the first final analog signal FAS-1 as the final analog signal FAS (S250). On the other hand, when the second final analog signal FAS-2 is greater than the predetermined lower reference value, the linear-logarithmic image sensor 100 may select the second final analog signal FAS-2 as the final analog signal FAS (S260). Next, the linear-logarithmic image sensor 100 may output the final analog signal FAS that is selected among the first through third final analog signals FAS-1, FAS-2, and FAS-3.

As described above, the first final analog signal FAS-1 may be the second analog signal AS2, where the second analog signal AS2 corresponds to a whole of the accumulated photo-charges of the storage node SN. In addition, the second final analog signal FAS-2 may be a sum of the leakage signal LS and the second analog signal AS2, where the leakage signal LS corresponds to the leakage photo-charges that leak from the storage node SN to the floating diffusion node FD while the photo-charges that are generated in response to the incident light by the photoelectric conversion device PD are accumulated in the storage node SN, and the second analog signal AS2 corresponds to a whole of the accumulated photo-charges of the storage node SN. Further, the third final analog signal FAS-3 may be a sum of the first analog signal AS1 and a predetermined offset signal OS, where the first analog signal AS1 corresponds to a portion of the accumulated photo-charges of the storage node SN. In brief, the linear-logarithmic image sensor 100 may effectively reduce a fixed pattern noise caused by threshold voltage distribution of transfer transistors TR1 of unit pixels 101 by dividing a signal generation region of the linear-logarithmic image sensor 100 into a linear region (e.g., a region for low illuminance), an extended linear region (e.g., a region for medium illuminance), and a logarithmic region (e.g., a region for high illuminance) and by using different final analog signals (i.e., FAS-1, FAS-2, and FAS-3) for the linear region, the extended linear region, and the logarithmic region (e.g., the first final analog signal FAS-1 is used in the linear region, the second final analog signal FAS-2 is used in the extended linear region, and the third final analog signal FAS-3 is used in the logarithmic region). As a result, an electronic device including the linear-logarithmic image sensor 100 may provide a high-quality image to a user.

Figure 12:
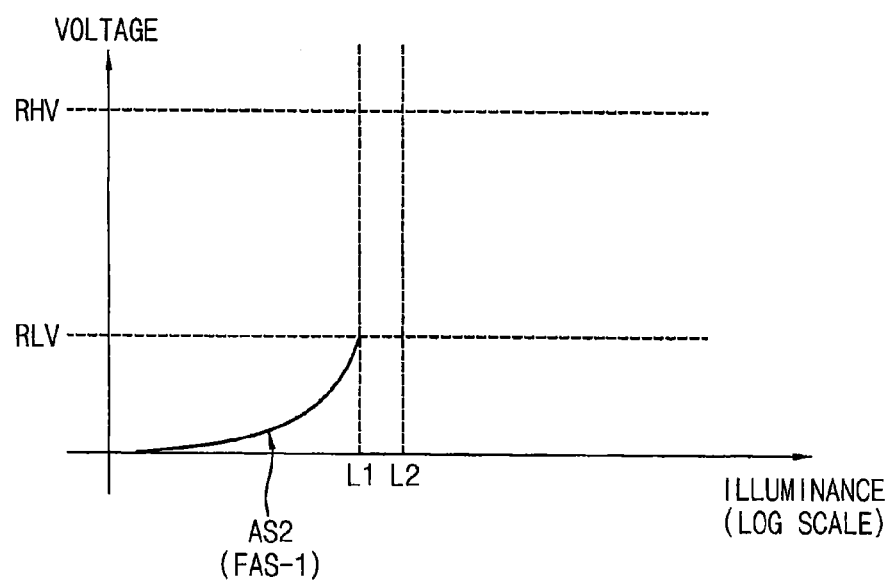
FIG. 12 is a graph illustrating a first final analog signal that is generated in a linear region by the linear-logarithmic image sensor of FIG. 1.
Figure 13A:
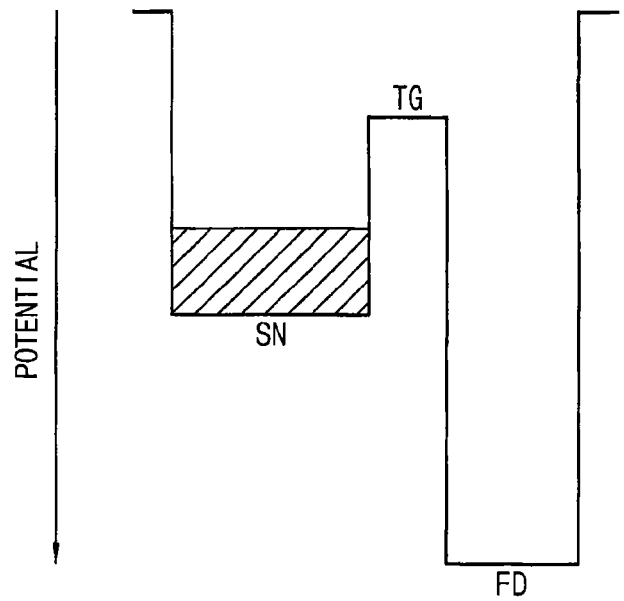
FIG. 13A through 13C are diagrams illustrating an example in which a first final analog signal is generated by the linear-logarithmic image sensor of FIG. 1.
Figure 13B:
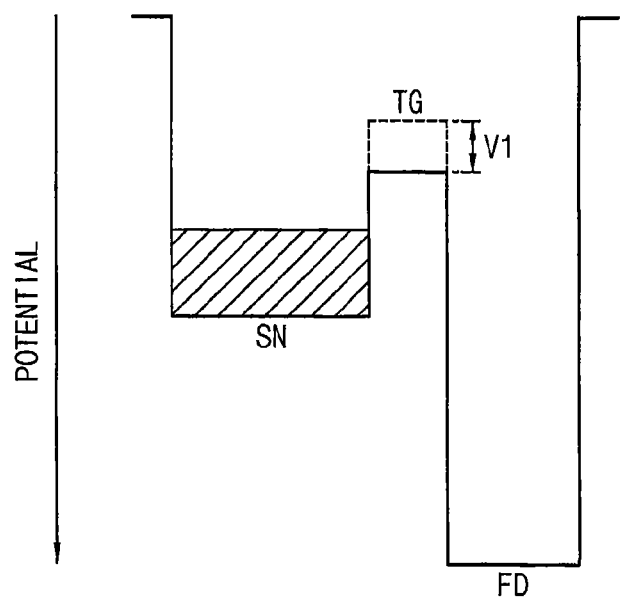
Figure 13C:
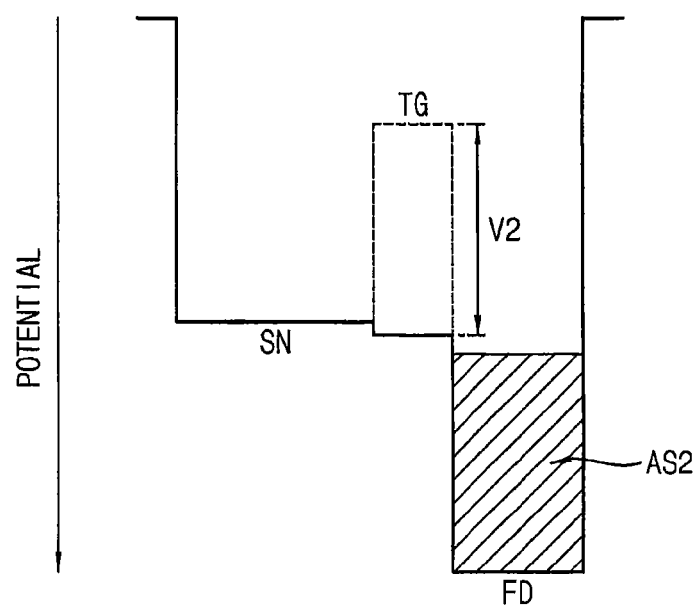

FIG. 12 is a graph illustrating a first final analog signal that is generated in a linear region by the linear-logarithmic image sensor of FIG. 1. FIG. 13A through 13C are diagrams illustrating an example in which a first final analog signal is generated by the linear-logarithmic image sensor of FIG. 1.

Referring to FIGS. 12 through 13C, the linear-logarithmic image sensor 100 may use the first final analog signal FAS-1 in the linear region of the linear-logarithmic image sensor 100 (e.g., a region for low illuminance), where the first final analog signal FAS-1 is the second analog signal AS2 that corresponds to an entirety of the accumulated photo-charges of the storage node SN. In some embodiments, the linear region of the linear-logarithmic image sensor 100 may be determined to be a region below a predetermined first reference value RLV. In another example embodiment, the linear region of the linear-logarithmic image sensor 100 may be determined to be a region below a predetermined first illuminance L1.

As illustrated in FIG. 13A, when the intensity of the incident light is relatively weak, an amount of the photo-charges that are accumulated in the storage node SN during the detection period DP may be relatively small. Thus, as illustrated in FIG. 13B, although the gate electrode TG of the transfer transistor TR1 receives the first transfer control signal TX1 that is activated to have the first voltage level V1 during the second period P2 of the output period OP, the accumulated photo-charges of the storage node SN may not be transferred to the floating diffusion node FD. As a result, the first analog signal AS1 that is output from the row selection transistor TR4 during the third period P3 of the output period OP may have a reset level. Subsequently, as illustrated in FIG. 13C, when the gate electrode TG of the transfer transistor TR1 receives the second transfer control signal TX2 that is activated to have the second voltage level V2 during the fourth period P4 of the output period OP, the remainder of the accumulated photo-charges in the storage node SN may be transferred to the floating diffusion node FD. As a result, the second analog signal AS2 that is output from the row selection transistor TR4 during the fifth period P5 of the output period OP may correspond to an entirety of the accumulated photo-charges in the storage node SN. As described above, when an intensity of the incident light is relatively weak, the accumulated photo-charges of the storage node SN may not leak while the photo-charges are accumulated in the storage node SN. Therefore, the linear-logarithmic image sensor 100 may use the first final analog signal FAS-1 (i.e., the second analog signal AS2) corresponding to a whole of the accumulated photo-charges of the storage node SN in the linear region of the linear-logarithmic image sensor 100.

Figure 14:
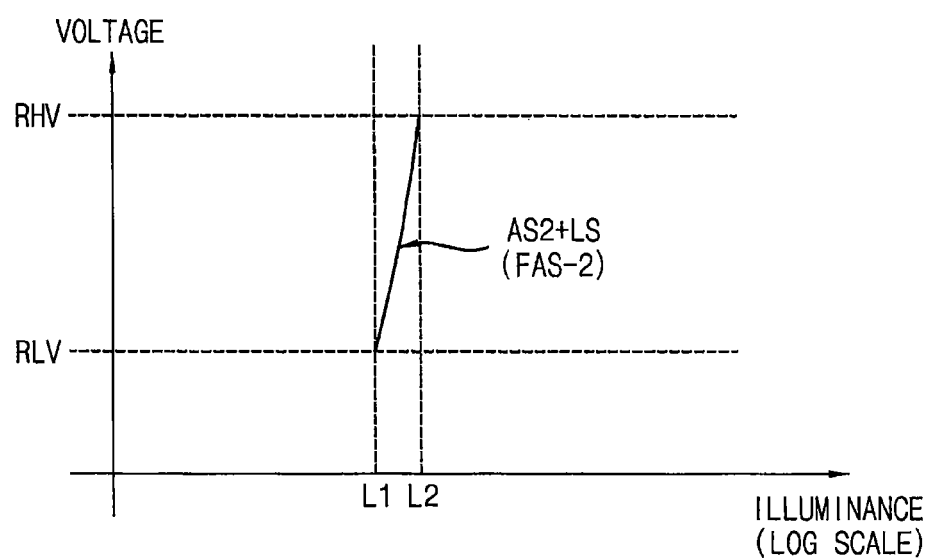
FIG. 14 is a graph illustrating a second final analog signal that is generated in an extended linear region by the linear-logarithmic image sensor of FIG. 1.
Figure 15A:
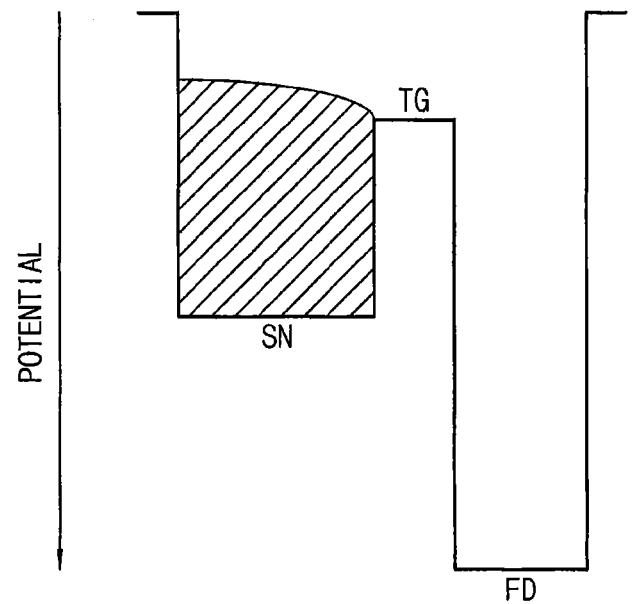
FIG. 15A through 15C are diagrams illustrating an example in which a second final analog signal is generated by the linear-logarithmic image sensor of FIG. 1.
Figure 15B:
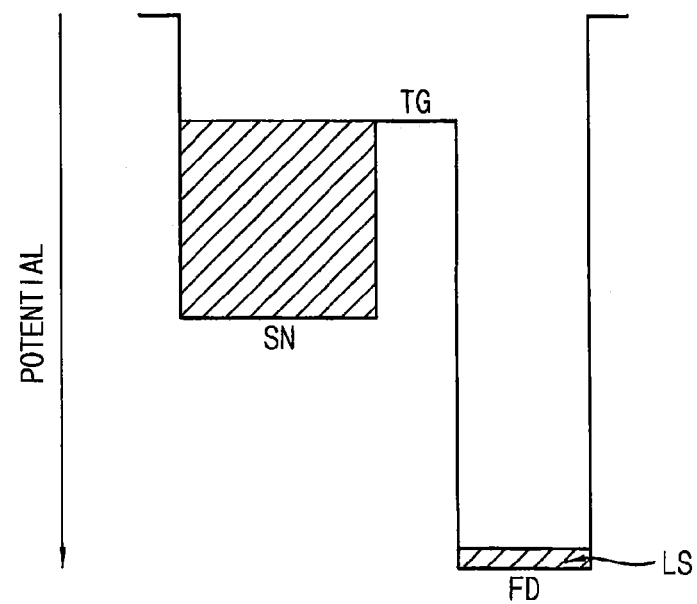
Figure 15C:
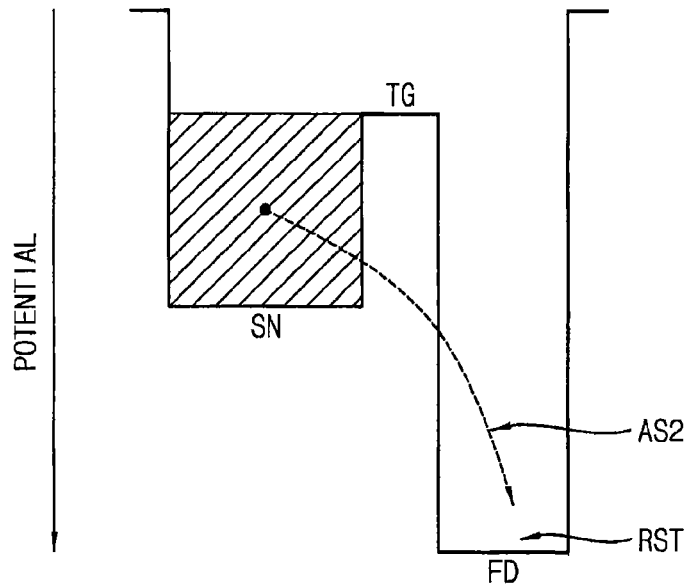

FIG. 14 is a graph illustrating a second final analog signal that is generated in an extended linear region by the linear-logarithmic image sensor of FIG. 1. FIG. 15A through 15C are diagrams illustrating an example in which a second final analog signal is generated by the linear-logarithmic image sensor of FIG. 1.

Referring to FIGS. 14 through 15C, the linear-logarithmic image sensor 100 may use the second final analog signal FAS-2 in the extended linear region of the linear-logarithmic image sensor 100 (e.g., a region for medium illuminance), where the second final analog signal FAS-2 is a sum of the leakage signal LS and the second analog signal AS2. As described above, the leakage signal LS may correspond to the leakage photo-charges that leak from the storage node SN to the floating diffusion node FD while the photo-charges that are generated in response to the incident light by the photo-electric conversion device PD are accumulated in the storage node SN. In addition, the second analog signal AS2 may correspond to a whole of the accumulated photo-charges of the storage node SN. In an example embodiment, the extended linear region of the linear-logarithmic image sensor 100 may be determined to be a region between a predetermined first reference value RLV and a predetermined second reference value RHV. In another example embodiment, the extended linear region of the linear-logarithmic image sensor 100 may be determined to be a region between a predetermined first illuminance L1 and a predetermined second illuminance L2.

As illustrated in FIG. 15A, an amount of the photo-charges that are accumulated in the storage node SN during the detection period DP when an intensity of the incident light is in a transition region between the linear region and the logarithmic region may be greater than an amount of the photo-charges that are accumulated in the storage node SN during the detection period DP when an intensity of the incident light is weak. Thus, as illustrated in FIG. 15B, the leakage photo-charges that leak from the storage node SN to the floating diffusion node FD may be caused during a portion of the detection period DP. Thus, the row selection transistor TR4 may output the leakage signal LS corresponding to the leakage photo-charges during the first period P1 of the output period OP. After the leakage signal LS is output, the floating diffusion node FD may be reset (i.e., indicated as RST) to discharge the leakage photo-charges to the power voltage VDD. Subsequently, although the gate electrode TG of the transfer transistor TR1 receives the first transfer control signal TX1 that is activated to have the first voltage level V1 during the second period P2 of the output period OP, the accumulated photo-charges of the storage node SN may not be transferred to the floating diffusion node FD. As a result, the first analog signal AS1 that is output from the row selection transistor TR4 during the third period P3 of the output period OP may have a reset level. On the other hand, as illustrated in FIG. 15C, when the gate electrode TG of the transfer transistor TR1 receives the second transfer control signal TX2 that is activated to have the second voltage level V2 during the fourth period P4 of the output period OP, a whole of the accumulated photo-charges of the storage node SN may be transferred to the floating diffusion node FD. As a result, the second analog signal AS2 that is output from the row selection transistor TR4 during the fifth period P5 of the output period OP may correspond to a whole of the accumulated photo-charges of the storage node SN. Therefore, the linear-logarithmic image sensor 100 may use the second final analog signal FAS-2 (i.e., a sum of the leakage signal LS corresponding to the leakage photo-charges and the second analog signal AS2 corresponding to a whole of the accumulated photo-charges of the storage node SN) in the extended linear region of the linear-logarithmic image sensor 100.

Figure 16:
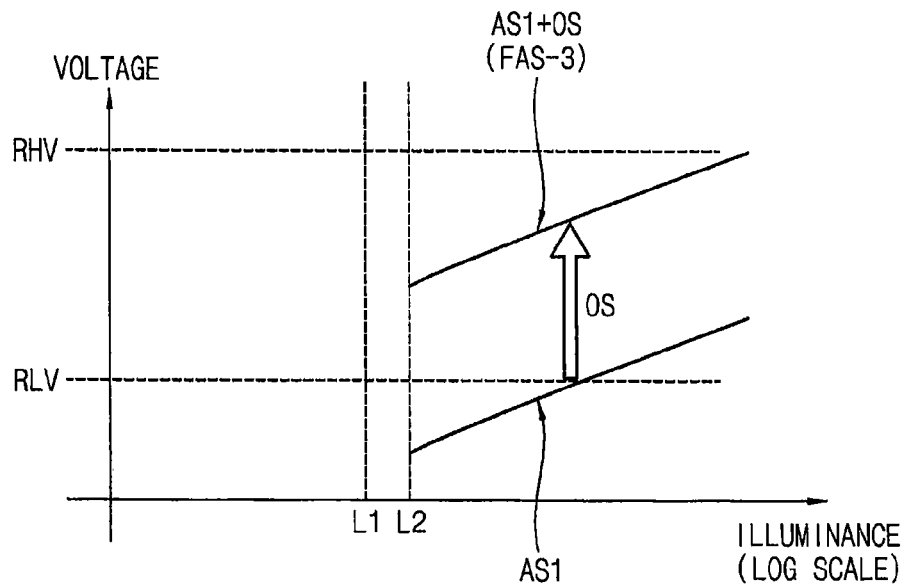
FIG. 16 is a graph illustrating a third final analog signal that is generated in a logarithmic region by the linear-logarithmic image sensor of FIG. 1.
Figure 17A:
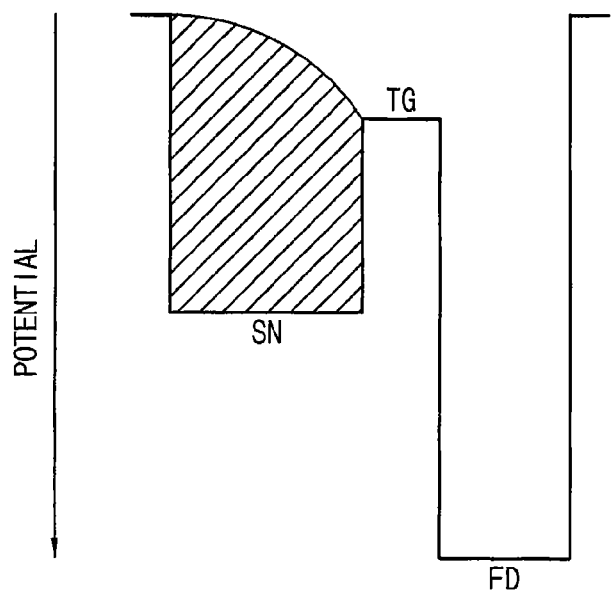
FIG. 17A through 17C are diagrams illustrating an example in which a third final analog signal is generated by the linear-logarithmic image sensor of FIG. 1.
Figure 17B:
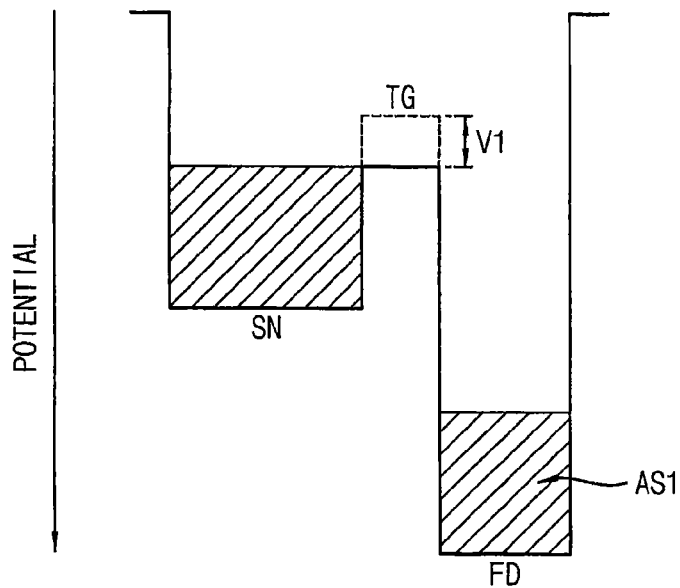
Figure 17C:
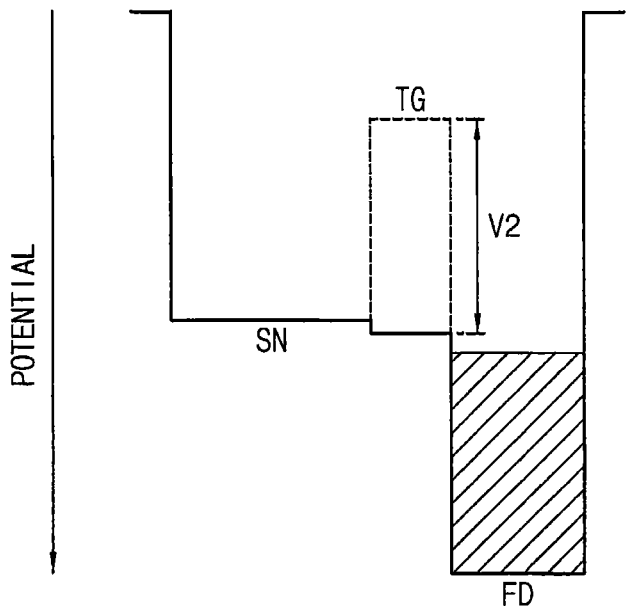

FIG. 16 is a graph illustrating a third final analog signal that is generated in a logarithmic region by the linear-logarithmic image sensor of FIG. 1. FIG. 17A through 17C are diagrams illustrating an example in which a third final analog signal is generated by the linear-logarithmic image sensor of FIG. 1.

Referring to FIGS. 16 through 17C, the linear-logarithmic image sensor 100 may use the third final analog signal FAS-3 in the logarithmic region of the linear-logarithmic image sensor 100 (e.g., a region for high illuminance), where the third final analog signal FAS-3 is a sum of the first analog signal AS1 corresponding to a portion of the accumulated photo-charges of the storage node SN and a predetermined offset signal OS. In an example embodiment, the logarithmic region of the linear-logarithmic image sensor 100 may be determined to be a region that is higher than a predetermined second reference value RHV. In another example embodiment, the logarithmic region of the linear-logarithmic image sensor 100 may be determined to be a region that is higher than a predetermined second illuminance L2.

As illustrated in FIG. 17A, when an intensity of the incident light is relatively strong, an amount of the photo-charges that are accumulated in the storage node SN during the detection period DP may be relatively great. Thus, the leakage photo-charges that leak from the storage node SN to the floating diffusion node FD may be caused during the detection period DP. However, since the floating diffusion node FD is electrically connected to the power voltage VDD, the leakage photo-charges may be discharged to the power voltage VDD. Subsequently, as illustrated in FIG. 17B, when the gate electrode TG of the transfer transistor TR1 receives the first transfer control signal TX1 that is activated to have the first voltage level V1 during the second period P2 of the output period OP, a portion of the accumulated photo-charges of the storage node SN may be transferred to the floating diffusion node FD. Thus, the row selection transistor TR4 may output the first analog signal AS1 corresponding to a portion of the accumulated photo-charges of the storage node SN during the third period P3 of the output period OP. Next, when the gate electrode TG of the transfer transistor TR1 receives the second transfer control signal TX2 that is activated to have the second voltage level V2 during the fourth period P4 of the output period OP, the rest of the accumulated photo-charges of the storage node SN may be transferred to the floating diffusion node FD. As a result, a whole of the accumulated photo-charges of the storage node SN may be stored in the floating diffusion node FD. Thus, the row selection transistor TR4 may output the second analog signal AS2 corresponding to a whole of the accumulated photo-charges of the storage node SN during the fifth period P5 of the output period OP. However, when an intensity of the incident light is relatively strong, the accumulated photo-charges of the storage node SN may leak while the photo-charges are accumulated in the storage node SN. Therefore, the linear-logarithmic image sensor 100 may use the third final analog signal FAS-3 (i.e., a sum of the first analog signal AS1 corresponding to a portion of the accumulated photo-charges of the storage node SN and the predetermined offset signal OS) in the logarithmic region of the linear-logarithmic image sensor 100.

Figure 18:
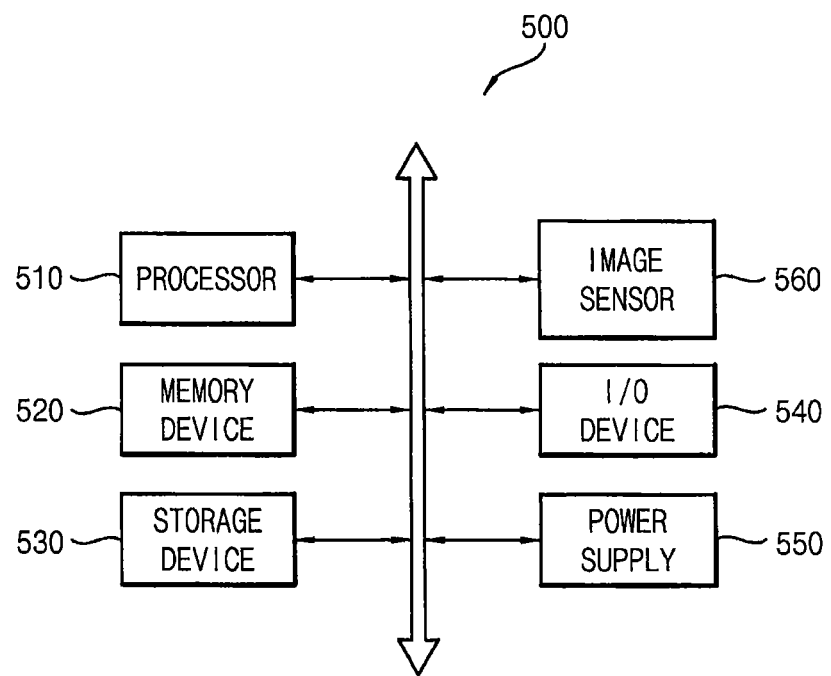
FIG. 18 is a block diagram illustrating an electronic device that includes the linear-logarithmic image sensor of FIG. 1.
Figure 19:
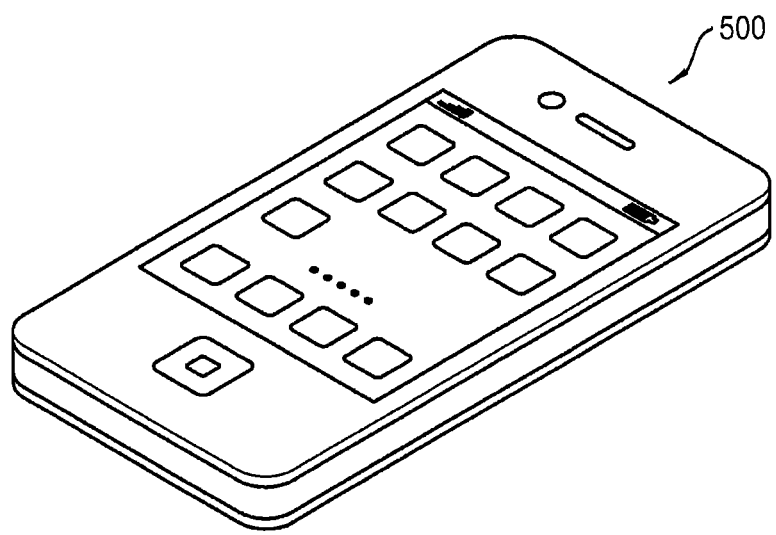
FIG. 19 is a diagram illustrating an example in which the electronic device of FIG. 18 is implemented as a smart-phone.

FIG. 18 is a block diagram illustrating an electronic device that includes the linear-logarithmic image sensor of FIG. 1. FIG. 19 is a diagram illustrating an example in which the electronic device of FIG. 18 is implemented as a smart phone.

Referring to FIGS. 18 and 19, the electronic device 500 may include a processor 510, a memory device 520, a storage device 530, an input/output (I/O) device 540, a power supply 550, and an image sensor 560. Here, the image sensor 560 may correspond to the linear-logarithmic image sensor 100 of FIG. 1. In addition, the electronic device 500 may further include a plurality of ports for communicating with a video card, a sound card, a memory card, a universal serial bus (USB) device, other electronic devices, etc. For example, as illustrated in FIG. 19, the electronic device 500 may be implemented as a smart phone.

The processor 510 may perform various computing functions. The processor 510 may be a micro processor, a central processing unit (CPU), an application processor (AP), etc. The processor 510 may be coupled to other components via an address bus, a control bus, a data bus, etc. In some example embodiments, the processor 510 may be coupled to an extended bus such as a peripheral component interconnection (PCI) bus. The memory device 520 may store data for operations of the electronic device 500. For example, the memory device 520 may include a volatile semiconductor memory device such as a dynamic random access memory (DRAM) device, a static random access memory (SRAM) device, a mobile DRAM, etc, and/or a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. The storage device 530 may include a solid state drive (SSD) device, a hard disk drive (HDD) device, a CD-ROM device, etc.

The I/O device 540 may include an input device such as a keyboard, a keypad, a touchpad, a touch-screen, a mouse, etc, and an output device such as a display device, a speaker, a printer, etc. The power supply 550 may provide power for operations of the electronic device 500. The image sensor 560 may communicate with other components via the buses or other communication links. As described above, the image sensor 560 may effectively reduce a fixed pattern noise caused by threshold voltage distribution of transfer transistors of unit pixels by dividing a signal generation region of the image sensor 560 into a linear region (e.g., a region for low illuminance), an extended linear region (e.g., a region for medium illuminance), and a logarithmic region (e.g., a region for high illuminance) and by using different final analog signals for the linear region, the extended linear region, and the logarithmic region (e.g., a first final analog signal is used in the linear region, a second final analog signal is used in the extended linear region, and a third final analog signal is used in the logarithmic region).

For this operation, the image sensor 560 may include a pixel array, a signal generation unit, and a control unit. The pixel array may include at least one unit pixel that generates a leakage signal corresponding to leakage photo-charges that leak from a storage node to a floating diffusion node while photo-charges that are generated in response to the incident light by a photoelectric conversion device are accumulated in the storage node, and then sequentially generates a first analog signal corresponding to a portion of the accumulated photo-charges and a second analog signal corresponding to a whole of the accumulated photo-charges by resetting the floating diffusion node and then transferring the accumulated photo-charges of the storage node to the floating diffusion node in response to first and second transfer control signals that are sequentially activated. The signal generation unit may include at least one signal generation block that generates a final analog signal based on the leakage signal, the first analog signal, and the second analog signal that are sequentially output from the unit pixel. The control unit may control the pixel array and the signal generation unit. In some example embodiments, the image sensor 560 may include an analog-digital conversion unit. Here, the analog-digital conversion unit may include at least one analog-digital conversion block that converts the final analog signal output from the signal generation block into a digital signal. Since these are described above, duplicated description will not be repeated.

The image sensor 560 may be implemented by various packages such as Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flat-Pack (TQFP), Small Outline Integrated Circuit (SOIC), Shrink Small Outline Package (SSOP), Thin Small Outline Package (TSOP), Thin Quad Flat-Pack (TQFP), System In Package (SIP), Multi Chip Package (MCP), Wafer-level Fabricated Package (WFP), Wafer-Level Processed Stack Package (WSP). In an example embodiment, the image sensor 560 may be integrated with the processor 510 in one chip. In another example embodiment, the image sensor 560 may be integrated in one chip, and the processor 510 may be integrated in another chip. Although it is illustrated in FIG. 19 that the electronic device 500 is implemented as a smart phone, the electronic device 500 is not limited thereto. That is, it should be understood that the electronic device 500 corresponds to any computing system that includes the image sensor 560. For example, the electronic device 500•may be implemented as a cellular phone, a smart phone, a smart pad, a personal digital assistant (PDA), a portable multimedia player (PMP), etc.

Figure 20:
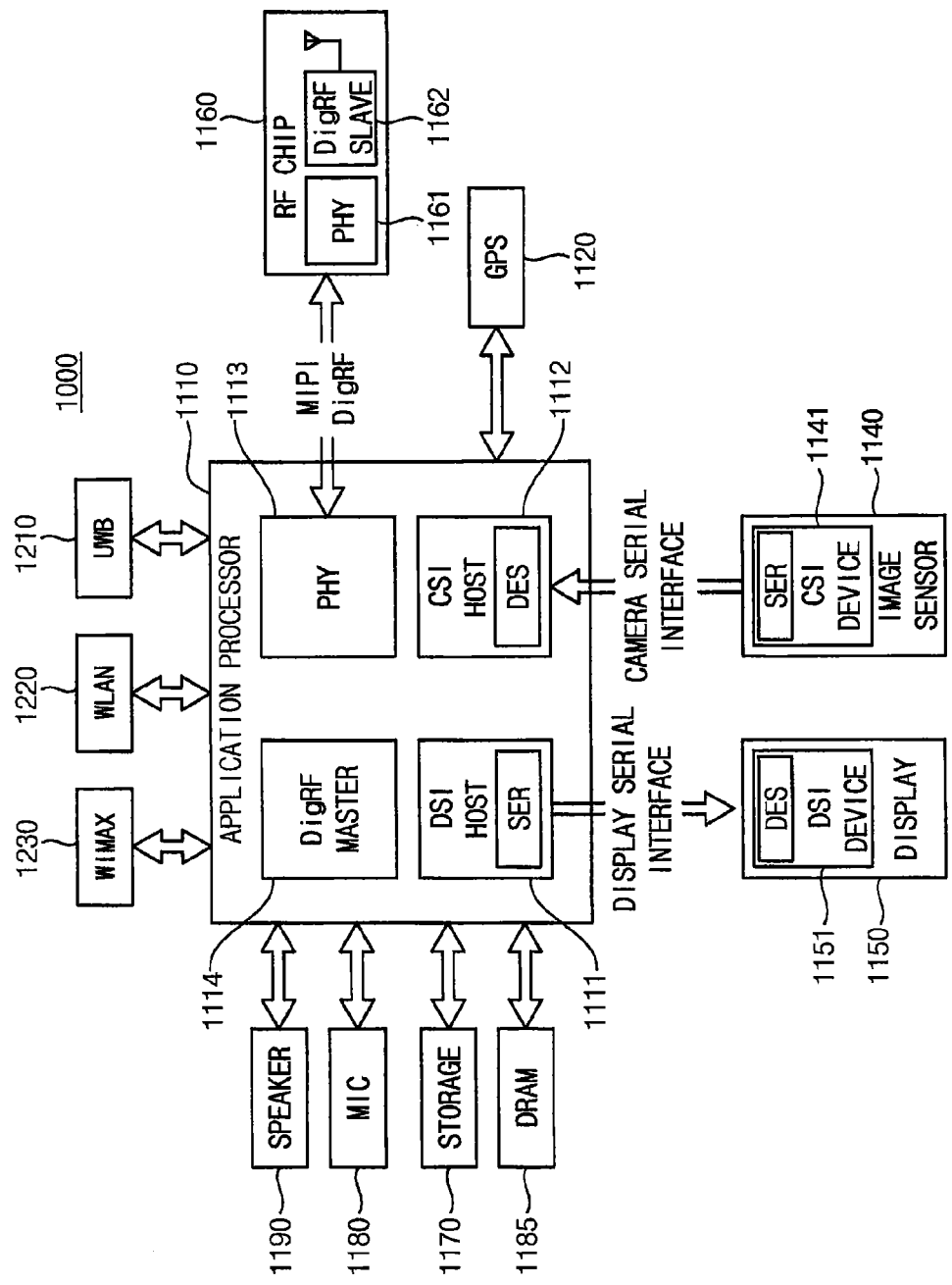
FIG. 20 is a block diagram illustrating an example of an interface used in the electronic device of FIG. 18.

FIG. 20 is a block diagram illustrating an example of an interface used in the electronic device of FIG. 18.

Referring to FIG. 20, the electronic device 1000 may be implemented by a data processing device that uses or supports a mobile industry processor interface (MIPI) interface (e.g., a mobile phone, a personal digital assistant (PDA), a portable multimedia player (PMP), a smart phone, etc). The electronic device 1000 may include an application processor 1010, an image sensor 1140, a display device 1150, and other various input/output devices discussed in detail below. A CSI host 1112 of the application processor 1110 may perform a serial communication with a CSI device 1141 of the image sensor 1140 using a camera serial interface (CSI). In an example embodiment, the CSI host 1112 may include a light deserializer (DES), and the CSI device 1141 may include a light serializer (SER). A DSI host 1111 of the application processor 1110 may perform a serial communication with a DSI device 1151 of the display device 1150 using a display serial interface (DSI). In an example embodiment, the DSI host 1111 may include a light serializer (SER), and the DSI device 1151 may include a light deserializer (DES). The electronic device 1000 may further include a radio frequency (RF) chip 1160. The RF chip 1160 may perform a communication with the application processor 1110. A physical layer (PHY) 1113 of the electronic device 1000 and a physical layer (PHY) 1161 of the RF chip 1160 may perform data communications based on a MIPI DigRF. The application processor 1110 may further include a DigRF MASTER 1114 that controls the data communications of the PHY 1161. The electronic device 1000 may include a global positioning system (GPS) 1120, a storage 1170, a MIC 1180, a DRAM device 1185, and a speaker 1190. The electronic device 1000 may perform communications using an ultra wideband (UWB) 1210, a wireless local area network (WLAN) 1220, a worldwide interoperability for microwave access (WIMAX) 1130, etc. However, a structure and an interface of the electronic device 1000 are not limited thereto.

The present inventive concepts may be applied to an image sensor and an electronic device including the image sensor. For example, the present inventive concepts may be applied to a computer, a laptop, a digital camera, a cellular phone, a smart-phone, a smart-pad, a tablet PC, a personal digital assistants (PDA), a portable multimedia player (PMP), a navigation system, a video phone, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concepts. Accordingly, all such modifications are intended to be included within the scope of the present inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A linear-logarithmic image sensor, comprising:
a pixel array including a unit pixel, the unit pixel comprising a photoelectric conversion device that generates photo-charges in response to incident light, a storage node connected to the photoelectric conversion device and that stores the photo-charges generated by the photoelectric conversion device, and a floating diffusion node connected to the storage node, wherein the unit pixel generates a leakage signal in response to leakage photo-charges that leak from the storage node to the floating diffusion node while photo-charges that are generated by the photoelectric conversion device in response to incident light are accumulated in the storage node, and wherein the unit pixel sequentially generates a first analog signal corresponding to a first portion of photo-charges accumulated in the storage node and a second analog signal corresponding to a second portion of the photo-charges accumulated in the storage node by transferring the accumulated photo-charges in the storage node to the floating diffusion node in response to first and second transfer control signals;
a signal generation unit including a signal generation block that generates a final analog signal in response to the leakage signal, the first analog signal, and the second analog signal; and
a control unit coupled to the pixel array and to the signal generation unit, the control unit configured to control the pixel array and the signal generation unit;
wherein the first transfer control signal has a first voltage level, and the second transfer control signal has a second voltage level that is higher than the first voltage level.

2. The image sensor of claim 1, further comprising:
an analog-digital conversion unit including an analog-digital conversion block that converts the final analog signal into a digital signal.

3. The image sensor of claim 1, wherein the signal generation block, selects one of a first final analog signal, a second final analog signal, and a third final analog signal as the final analog signal, the first final analog signal corresponding to the second analog signal, the second final analog signal corresponding to a sum of the second analog signal and the leakage signal, the third final analog signal corresponding to a sum of the first analog signal and a predetermined offset signal.

4. The image sensor of claim 3, wherein the signal generation block selects the first final analog signal as the final analog signal in response to determining that the second final analog signal is smaller than a predetermined first reference value, wherein the signal generation block selects the second final analog signal as the final analog signal in response to determining that the second final analog signal is greater than the predetermined first reference value and smaller than a predetermined second reference value, and wherein the signal generation block selects the third final analog signal as the final analog signal in response to determining that the second final analog signal is greater than the predetermined second reference value.

5. The image sensor of claim 3, wherein the signal generation block selects the first final analog signal as the final analog signal in response to determining that an intensity of the incident light is smaller than a predetermined first illuminance, wherein the signal generation block selects the second final analog signal as the final analog signal in response to determining that the intensity of the incident light is greater than the predetermined first illuminance and smaller than a predetermined second illuminance, and wherein the signal generation block selects the third final analog signal as the final analog signal in response to determining that the intensity of the incident light is greater than the predetermined second illuminance.

6. The image sensor of claim 1, wherein the unit pixel comprises:

a transfer transistor having a source electrode corresponding to the storage node, a drain electrode corresponding to the floating diffusion node, and a gate electrode to which the first transfer control signal and the second transfer control signal are applied;

a reset transistor having a source electrode coupled to the floating diffusion node, a drain electrode coupled to a power supply, and a gate electrode to which a reset control signal is applied;

a sensing transistor having a drain electrode coupled to the power supply and a gate electrode coupled to the floating diffusion node; and a row selection transistor having a drain electrode coupled to a source electrode of the sensing transistor, a gate electrode to which a row selection signal is applied, and a source electrode at which the leakage signal, the first analog signal, and the second analog signal are output.

7. The image sensor of claim 6, wherein the reset transistor is turned off while the leakage photo-charges leak to the floating diffusion node from the storage node, wherein the floating diffusion node is reset when the reset transistor is turned on, and wherein the reset transistor is turned of while the accumulated photo-charges are transferred to the floating diffusion node.

8. The image sensor of claim 6, wherein the transfer transistor transfers the first portion of the accumulated photo-charges to the floating diffusion node in response to the first transfer control signal that is activated to have the first voltage level, and wherein the transfer transistor transfers a remainder of the accumulated photo-charges to the floating diffusion node in response to the second transfer control signal that is activated to have the second voltage level.

9. The image sensor of claim 6, wherein the leakage signal corresponding to the leakage photo-charges stored in the floating diffusion node, the first analog signal corresponding to the first portion of the accumulated photo-charges stored in the floating diffusion node, and the second analog signal corresponding to the entirety of the accumulated photo-charges stored in the floating diffusion node are output sequentially when the row selection transistor is turned on.

10. An electronic device, comprising:

a linear-logarithmic image sensor;

a storage device; and a processor configured to control the linear-logarithmic image sensor and the storage device, wherein the linear-logarithmic image sensor comprises;

a pixel array including a unit pixel that generates a leakage signal corresponding to leakage photo-charges that leak from a storage node to a floating diffusion node while photo-charges that are generated in response to incident light by a photoelectric conversion device are accumulated in the storage node and that sequentially generates a first analog signal corresponding to a first portion of accumulated photo-charges and a second analog signal corresponding to a second portion of the accumulated photo-charges by transferring the accumulated photo-charges in the storage node to the floating diffusion node in response to first and second transfer control signals;

a signal generation unit including a signal generation block that generates a final analog signal in response to the leakage signal, the first analog signal, and the second analog signal;

an analog-digital conversion unit including an analog-digital conversion block that converts the final analog signal into a digital signal; and a control unit configured to control the pixel array, the signal generation unit, and the analog-digital conversion unit;

wherein the first transfer control signal has a first voltage level, and the second transfer control signal has a second voltage level, that is higher than the first voltage level.

11. The electronic device of claim 10, wherein the signal generation block selects one of a first final analog signal, a second final analog signal, and a third final analog signal as the final analog signal, the first final analog signal corresponding to the second analog signal, the second final analog signal corresponding to a sum of the second analog signal and the leakage signal, the third final analog signal corresponding to a sum of the first analog signal and a predetermined offset signal.

12. The electronic device of claim 10, wherein the signal generation block selects the first final analog signal as the final analog signal in response to the second final analog signal being smaller than a predetermined first reference value, wherein the signal generation block selects the second final analog signal as the final analog signal in response to the second final analog signal being greater than the predetermined first reference value and smaller than a predetermined second reference value, and wherein the signal generation block selects the third final analog signal as the final analog signal in response to the second final analog signal being greater than the predetermined second reference value.

13. The electronic device of claim 10, wherein the signal generation block selects the first final analog signal as the final analog signal in response to an intensity of the incident light being smaller than a predetermined first illuminance, wherein the signal generation block selects the second final analog signal as the final analog signal in response to the intensity of the incident light being greater than the predetermined first illuminance and smaller than a predetermined second illuminance, and wherein the signal generation block selects the third final analog signal as the final analog signal in response to the intensity of the incident light being greater than the predetermined second illuminance.

14. An image sensor, comprising:

a pixel array including a plurality of pixels that generate a first analog signal in response to a first portion of photo-charges that are generated in response to incident light, second analog signal in response to a second portion of the photo-charges, and a leakage signal, generated in response to leakage photo-charges, wherein the second portion of photo-charges includes the first portion of photo-charges; and a signal generation unit that generates a final analog signal in response to the leakage signal, the first analog signal, and the second analog signal;

wherein each of the plurality of pixels comprises a photoelectric conversion device that generates the photo-charges in response to incident light, a storage node connected to the photoelectric conversion device and that stores the photo-charges generated by the photoelectric conversion device, and a floating diffusion node connected to the storage node;

wherein each of the pixels generates the leakage signal in response to leakage photo-charges that leak from the storage node to the floating diffusion node while photo-charges that are generated by the photoelectric conversion device in response to incident light are accumulated in the storage node;

wherein each of the pixels sequentially generates the first analog signal and the second analog signal by transferring photo-charges from the storage node to the floating diffusion node in response to first and second transfer control signals; and wherein the first transfer control signal has a first voltage level, and the second transfer control signal has a second voltage level that is higher than the first voltage level.

* * * * *